(12) United States Patent
Minard et al.

(10) Patent No.: US 12,490,865 B2
(45) Date of Patent: Dec. 9, 2025

(54) AUTOMATED FOOD MANAGEMENT SYSTEM

(71) Applicant: TAYLOR COMMERCIAL FOODSERVICE, LLC, Rockton, IL (US)

(72) Inventors: James J. Minard, Rockton, IL (US); Dennis Nelson, Rockton, IL (US); Jeffrey L. Sands, Rockton, IL (US); Scott A. Leclerc, Ashby, MA (US); Bryan R. Hotaling, Harvard, MA (US); Spencer M. Parker, Arlington, MA (US); Chris Norris, Rockton, IL (US); Carl Pahnke, Rockton, IL (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 290 days.

(21) Appl. No.: 17/897,952

(22) Filed: Aug. 29, 2022

(65) Prior Publication Data
US 2022/0408972 A1  Dec. 29, 2022

Related U.S. Application Data

(62) Division of application No. 16/798,620, filed on Feb. 24, 2020, now Pat. No. 12,042,093.
(Continued)

(51) Int. Cl.
*A47J 36/24* (2006.01)
*A47J 37/04* (2006.01)
*A47J 39/00* (2006.01)

(52) U.S. Cl.
CPC ......... *A47J 39/006* (2013.01); *A47J 36/2483* (2013.01); *A47J 37/045* (2013.01)

(58) Field of Classification Search
CPC .... A47J 37/044; A47J 37/1228; A47J 36/321; A47J 37/0658; A47J 39/006; A47J 41/0044; A47J 47/01
(Continued)

(56) References Cited

U.S. PATENT DOCUMENTS

| 4,922,435 A | 5/1990 | Cahlander et al. |
| 5,113,753 A | 5/1992 | Cahlander et al. |

(Continued)

FOREIGN PATENT DOCUMENTS

| CN | 102361806 | 2/2012 |
| CN | 104687099 | 12/2013 |

(Continued)

OTHER PUBLICATIONS

English translation of Office Action issued in Appl. No. CN202080016296.X (Jun. 27, 2022).
(Continued)

*Primary Examiner* — Chris Q Liu
(74) *Attorney, Agent, or Firm* — Barnes & Thornburg LLP

(57) ABSTRACT

A system to store food products within a heated compartment is provided. The system includes an enclosure that receives stacked trays, and an elevator to lift trays to a position to receive a plurality of food products from a conveyor or another source. A fork may be provided that receives a cooked food product thereon and rotates to allow the cooked food product to fall into the positioned tray while being maintained in a horizontal manner. A shuttle moves a full tray into a heated compartment, which moves trays therewithin to organize them for future use within a restaurant operation.

6 Claims, 30 Drawing Sheets

Related U.S. Application Data

(60) Provisional application No. 62/810,170, filed on Feb. 25, 2019.

(58) Field of Classification Search
USPC ...... 99/357, 326, 339, 352, 355, 386, 450.4, 99/325, 334, 336, 407, 409, 448, 450.5, 99/451, 467, 484
See application file for complete search history.

(56) References Cited

U.S. PATENT DOCUMENTS

| | | | |
|---|---|---|---|
| 5,113,754 A * | 5/1992 | Robinson | A47J 37/045 |
| | | | 99/387 |
| 5,172,328 A | 12/1992 | Cahlander et al. | |
| 5,791,234 A | 8/1998 | Newton et al. | |
| 5,910,207 A | 6/1999 | Newton et al. | |
| 6,016,743 A | 1/2000 | Glavan | |
| 6,331,323 B1 * | 12/2001 | Adler-Nissen | A47J 37/1228 |
| | | | 426/523 |
| 7,448,373 B2 | 11/2008 | Hill et al. | |
| 7,472,645 B2 | 1/2009 | Hill et al. | |
| 8,252,232 B2 * | 8/2012 | Neeper | G01N 35/0099 |
| | | | 422/65 |
| 8,253,581 B2 | 8/2012 | Sands | |
| 8,652,556 B1 | 2/2014 | Kovacs et al. | |
| D706,621 S | 6/2014 | Tuchrelo | |
| 9,181,034 B2 | 11/2015 | Peters et al. | |
| 9,295,282 B2 * | 3/2016 | Vardakostas | A21C 15/002 |
| D756,769 S | 5/2016 | Tuchrelo | |
| 9,386,799 B2 * | 7/2016 | Vardakostas | G07F 17/0078 |
| 9,538,766 B2 * | 1/2017 | Weiss | A21B 7/00 |
| 9,719,830 B2 | 8/2017 | Minard | |
| 9,861,230 B2 | 1/2018 | Freymiller | |
| 9,927,382 B2 | 3/2018 | Freymiller et al. | |
| 10,010,218 B2 | 7/2018 | Sands et al. | |
| 10,098,499 B2 | 10/2018 | Nelson | |
| 10,117,545 B2 | 11/2018 | Nelson et al. | |
| 10,159,379 B2 | 12/2018 | Nelson | |
| 10,213,050 B2 | 2/2019 | Freymiller et al. | |
| 2003/0196558 A1 | 10/2003 | Sands | |
| 2006/0263192 A1 | 11/2006 | Hart et al. | |
| 2007/0172396 A1 | 7/2007 | Neeper et al. | |
| 2009/0090252 A1 | 4/2009 | Ewald et al. | |
| 2009/0199725 A1 | 8/2009 | Veltrop et al. | |
| 2012/0067227 A1 | 3/2012 | Weiss | |
| 2013/0071534 A1 | 3/2013 | Newton | |
| 2013/0164421 A1 | 6/2013 | Hill | |
| 2015/0108110 A1 | 4/2015 | Freymiller et al. | |
| 2015/0164131 A1 | 6/2015 | Vardakostas et al. | |
| 2015/0305557 A1 | 10/2015 | Nelson | |
| 2016/0037967 A1 | 2/2016 | Glavan et al. | |
| 2016/0045066 A1 | 2/2016 | Sands et al. | |
| 2016/0309941 A1 | 10/2016 | Minard | |
| 2017/0057805 A1 | 3/2017 | Bischel | |
| 2018/0360269 A1 | 12/2018 | Sands et al. | |
| 2019/0038073 A1 | 2/2019 | Nelson | |
| 2019/0045972 A1 | 2/2019 | Frevmiller et al. | |
| 2019/0057344 A1 | 2/2019 | Minard | |
| 2019/0059399 A1 * | 2/2019 | Meinert | A22C 7/0084 |
| 2019/0059641 A1 | 2/2019 | Minard et al. | |
| 2019/0059643 A1 * | 2/2019 | Minard | A47J 37/045 |
| 2019/0059644 A1 * | 2/2019 | Nelson | A47J 36/321 |
| 2019/0059645 A1 | 2/2019 | Nelson et al. | |
| 2019/0062052 A1 * | 2/2019 | Sands | B65G 1/10 |
| 2019/0075966 A1 | 3/2019 | Kelly | |
| 2019/0104883 A1 * | 4/2019 | Nelson | A47J 44/00 |
| 2019/0104885 A1 | 4/2019 | Pahnke et al. | |
| 2019/0117019 A1 | 4/2019 | Minard | |
| 2020/0385206 A1 | 12/2020 | El Ghali | |

FOREIGN PATENT DOCUMENTS

| | | |
|---|---|---|
| CN | 103689299 | 4/2014 |
| CN | 203789100 U | 8/2014 |
| CN | 104519746 A | 4/2015 |
| CN | 206984429 U | 2/2018 |
| CN | 109195446 A | 1/2019 |
| WO | 02/092481 | 11/2002 |
| WO | 2013/184910 | 12/2013 |
| WO | 2017/106142 | 6/2017 |
| WO | 2019/070959 | 4/2019 |

OTHER PUBLICATIONS

Extended Search Report issued in Appl. No. EP21213900.0 (Jun. 3, 2022).

International Search Report and Written Opinion for International Application No. PCT/US2020/019409, dated Sep. 22, 2020.

Claw Definition, 2022, Meriam-Webster (Year: 20220).

Chinese First Office Action and Search Report with English translation, dated Apr. 3, 2025, Application No. 202211493558.9, 17 pages.

Examination Report from corresponding CN patent application No. 202310180836.3 (Sep. 14, 2025).

Chinese Application No. 202211493558.9, Notice of Allowance dated Sep. 3, 2025 plus English translation (7 pages).

* cited by examiner

AUTOMATED FOOD MANAGEMENT SYSTEM

CROSS-REFERENCE TO RELATED APPLICATIONS

This application is a United States divisional application of U.S. application Ser. No. 16/798,620, filed on Feb. 24, 2020, which claims priority from U.S. Provisional Application No. 62/810,170, filed on Feb. 25, 2019, the entirety of which are each hereby fully incorporated by reference herein.

BACKGROUND

Technical Field

This disclosure relates to systems that are adapted to receive and store cooked food products, such as hamburger patties, from an automated cooking device. While automated cooking devices are often beneficial within a restaurant or cooking facility that requires a significant amount of output continuously or at peak times, both to allow tasks to be performed automatically and to allow for consistent quality control, it is often burdensome to receive and store the cooked food products for later further cooking or for preparing saleable items for a customer due to the need to store and organize the cooked food products before they can be further processed or prepared for sale. Accordingly, automated devices to store cooked food products in an environment suitable for storing cooked food products are needed to achieve the benefits of the automated cooking process.

BRIEF SUMMARY

A first representative embodiment of the disclosure is provided. The embodiment includes an automated food management system. The system includes an enclosure, the enclosure is configured to receive a plurality of stacked trays, and an elevator that is configured to lift a tray from a plurality of stacked trays when received within the enclosure to a position where the lifted tray can receive the cooked food product, the enclosure further comprises a fork that receives a cooked food product thereon and rotates to allow the cooked food product to fall into the positioned tray. A holding compartment with a shuttle, the shuttle longitudinally movable between a first position within the holding compartment and a second position disposed to support the lifted tray in a position to receive a cooked food product from the fork, the holding compartment capable of supporting a plurality of trays in a vertical arrangement such that a lowest supported tray in the vertical arrangement is the tray most recently positioned within the holding compartment and the highest supported tray in the vertical arrangement is the tray that has been positioned within the holding compartment for the longest time.

Another representative embodiment of the disclosure is provided. The embodiment includes a mechanism to automatically dispose a food product upon an object moving upon a conveyor. The mechanism includes a housing to receive and store a food product to be dispensed and a shaft rotationally coupled to the housing and configured to receive torque from an external source such that the shaft rotates upon rotation of the external source, the shaft comprises an input configured to engage with the external source and receive torque from the external source, the input disposed at an eccentric position upon the shaft with respect to a longitudinal axis of the shaft through a center of the shaft, such that rotation of the external source causes rotation of the shaft and reciprocating cyclic linear motion of the shaft with respect to a longitudinal axis through a center of the external source.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
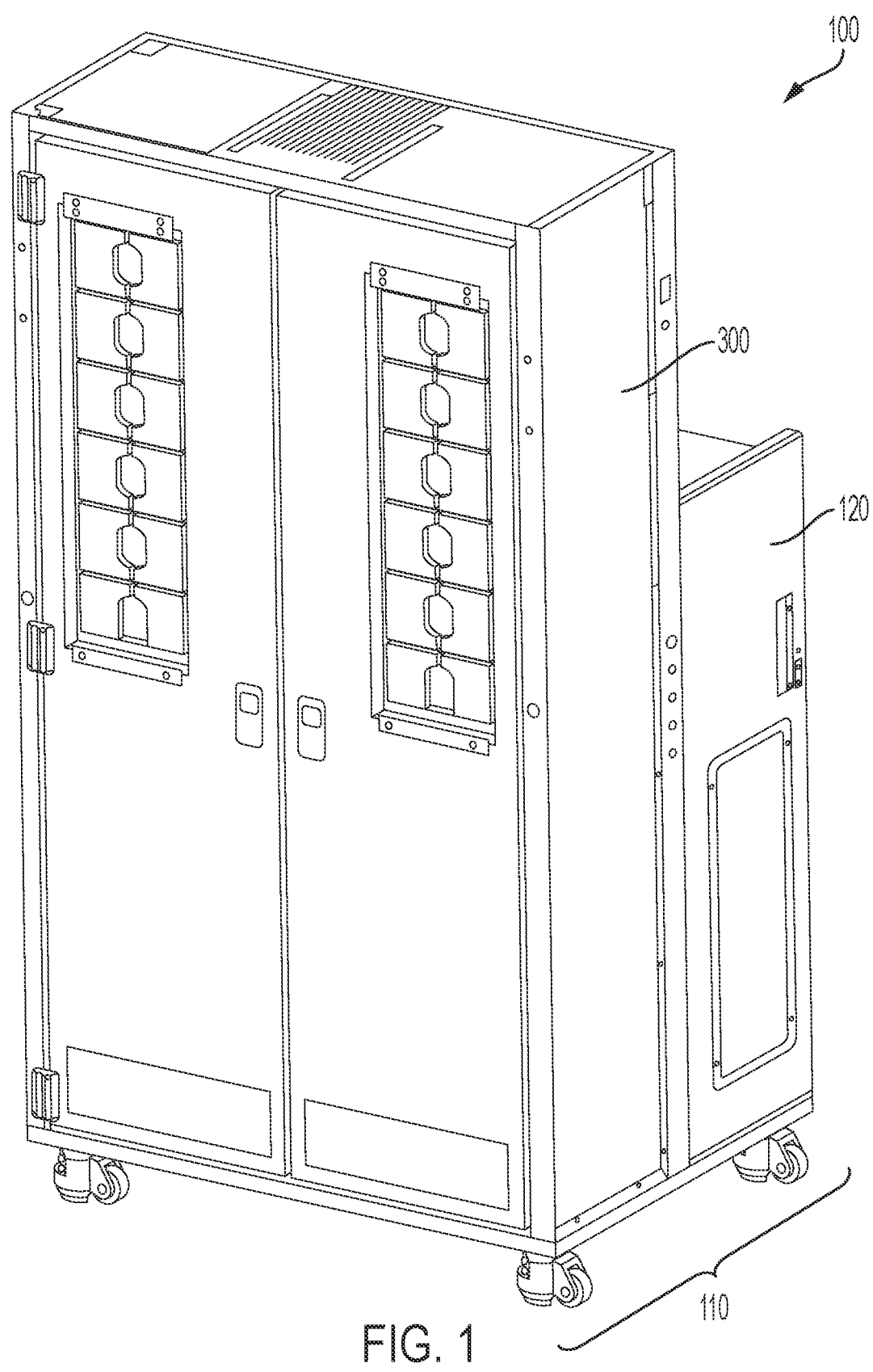
FIG. 1 is a perspective view of an automated food management system.
Figure 2:
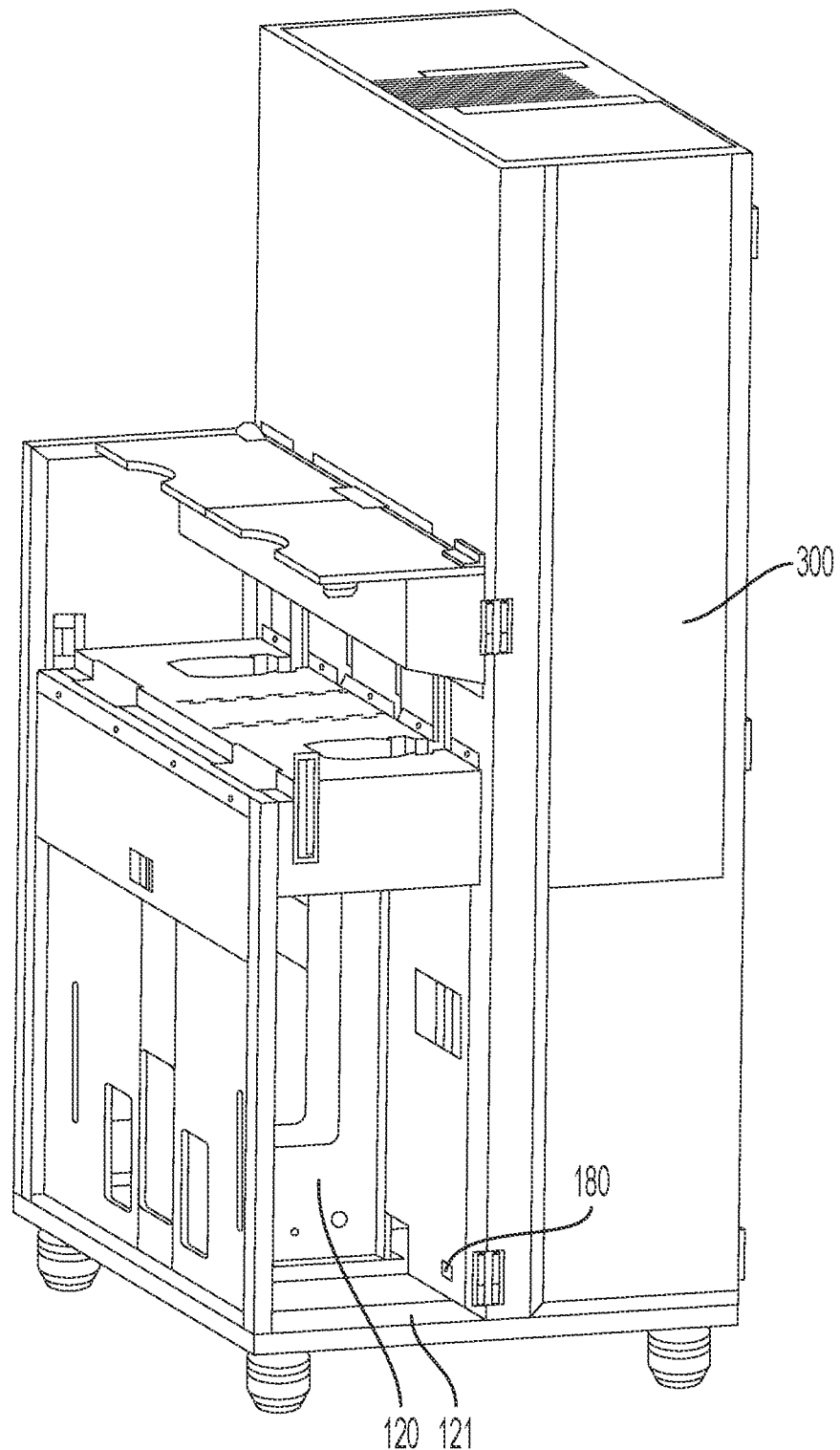
FIG. 2 is another perspective view of the system of FIG. 1 depicting the enclosure.
Figure 2A:
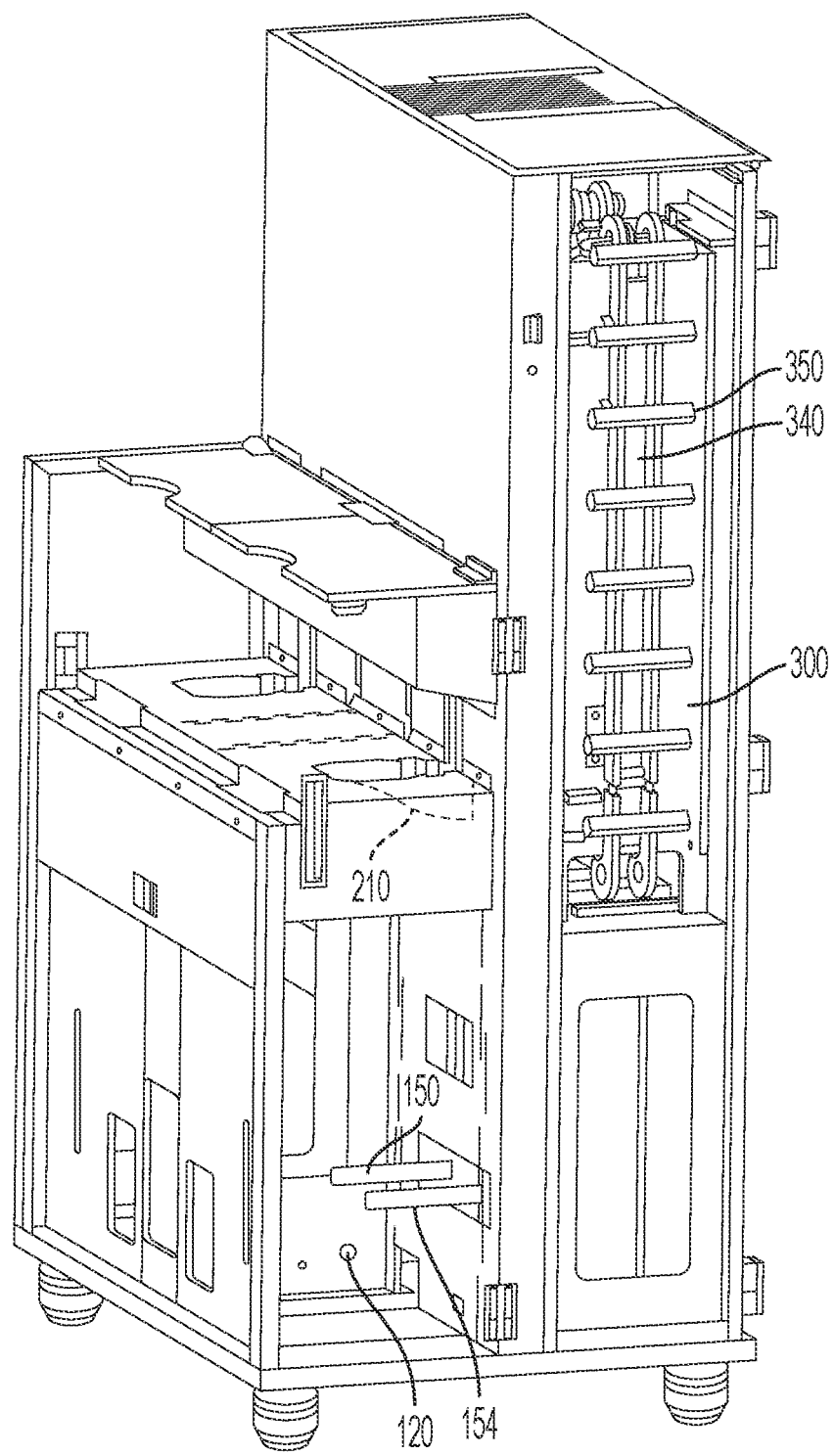
FIG. 2*a* is the view of FIG. 3 with a side panel of the housing removed to depict a portion of the heated compartment and the belt therewithin.

Turning now to FIGS. 1-23, an automated food management system 100 is provided. The system 100 is configured to repeatedly receive cooked food products 99 that are cooked and moved to the system. The system 100 is described in detail herein for use with cooked food products that are cooked by a grill 501, and after being cooked by the grill 501 are moved to the system by a conveyor 502 (each shown schematically in FIGS. 22 and 23). One of ordinary skill with a thorough review of this disclosure will readily understand that that disclosed system may be readily used with other cooking appliances such as a broiler or an oven, and the cooked food products can be moved to the proximity of the system 100 with any movement system, such as a robotic arm, a belt drive, or the like. The system could also be used to receive food products that have been frozen before disposal proximate to the system and in those embodiments could be used to store frozen food products. While the system 100 is discussed with respect to a cooked food product herein for the sake of brevity, the system would also work with frozen food products or even food products at room temperature or at another temperature or status.

The system 100 includes a housing 110 that includes an enclosure 120, and a holding compartment 300, an elevator 150 to move a tray 900 vertically within the enclosure 120, a shuttle 310 to receive the lifted tray 900 from the elevator 150 and after the tray 900 receives one or more cooked food products the shuttle 310 move the tray 900 into the heated compartment 300 where it is stored until it is removed therefrom by a cook. The system 100 further may include a rotatable fork 210 that is rotatable between a first acceptance position to interact with a cooked food product 99 brought into proximity with the system 100, and a release position to allow the cooked food product 99 to fall into a tray 900 disposed below the fork. As discussed below, the placement and operation of the fork 210 assists with maintaining the cooked food product 99 in a substantially horizontal orientation as the cooked food product 99 comes into the proximity with the system 100, such as moving to the end of a conveyor 502 (FIGS. 22 and 23) aligned to direct cooked food products to the fork 210, and the rotation of the fork 210 aids in maintaining the cooked food product 99 in the substantially horizontal orientation as it falls into the tray 900, as discussed below. The term "substantially horizontal" is defined herein to include an actual horizontal configuration in addition to an orientation that is not exactly horizontal but is no more than 10 to 20 degrees angled from the horizontal. The term is intended such that even if a cooked food product 99 is not exactly horizontal the cooked food product 99 will return to a horizontal orientation when landing upon the tray 900 (or upon cooked food products 99 already in the tray 900 to form a stack). The cooked food product 99 is desired to be maintained substantially horizontal such that a food product 4001 that is applied upon the cooked food product 99 before the cooked food product reaches the fork 210 (as described below and depicted in FIGS. 22-29) will remain upon the cooked food product 99 as it falls into the tray 900 from a source (such as a conveyor 502) as aided by the fork 210.

Figure 3:
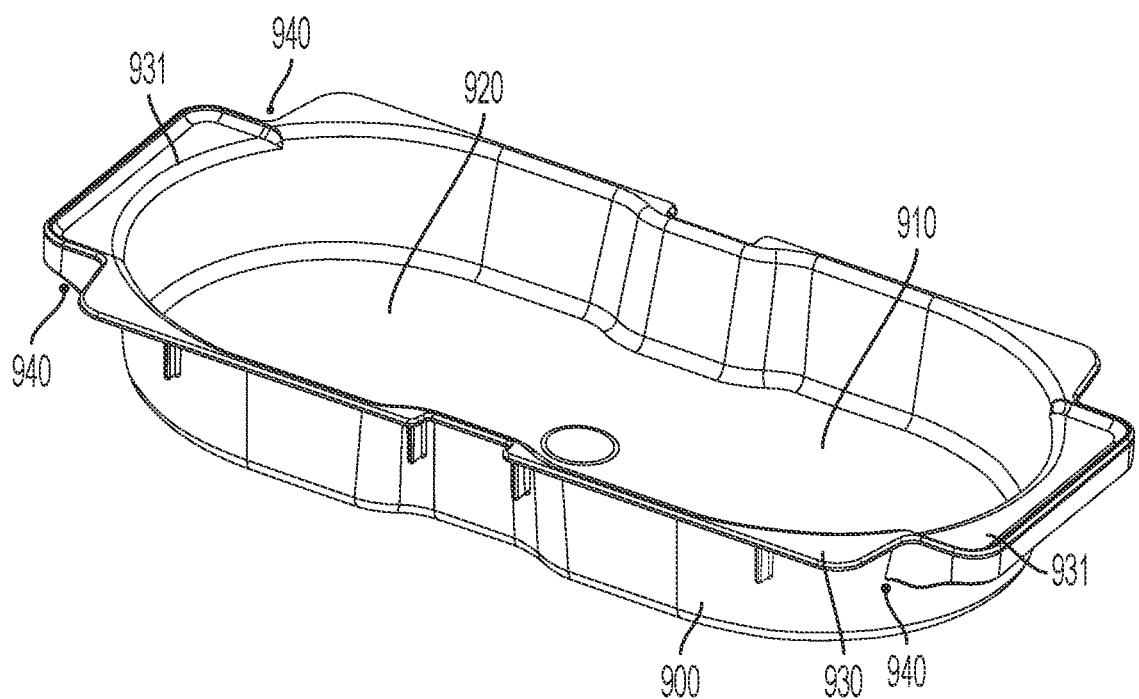
FIG. 3 is a perspective view of a tray usable with the system of FIG. 1, the tray configured to receive a plurality of stacks each including plurality of cooked food products.
Figure 4:
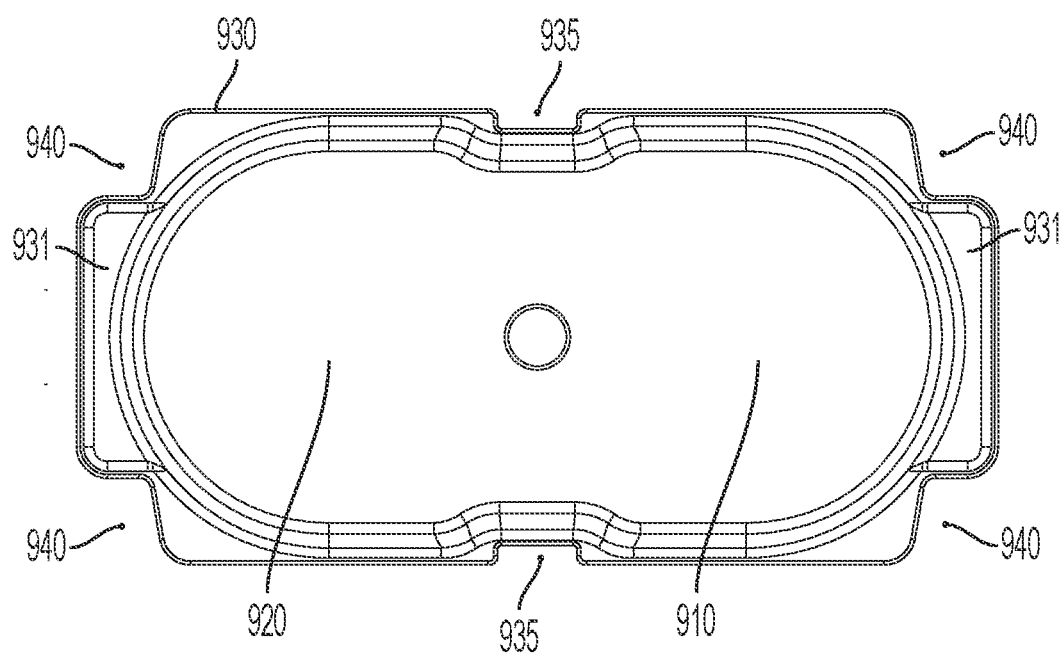
FIG. 4 is a top view of the tray of FIG. 3.
Figure 5:
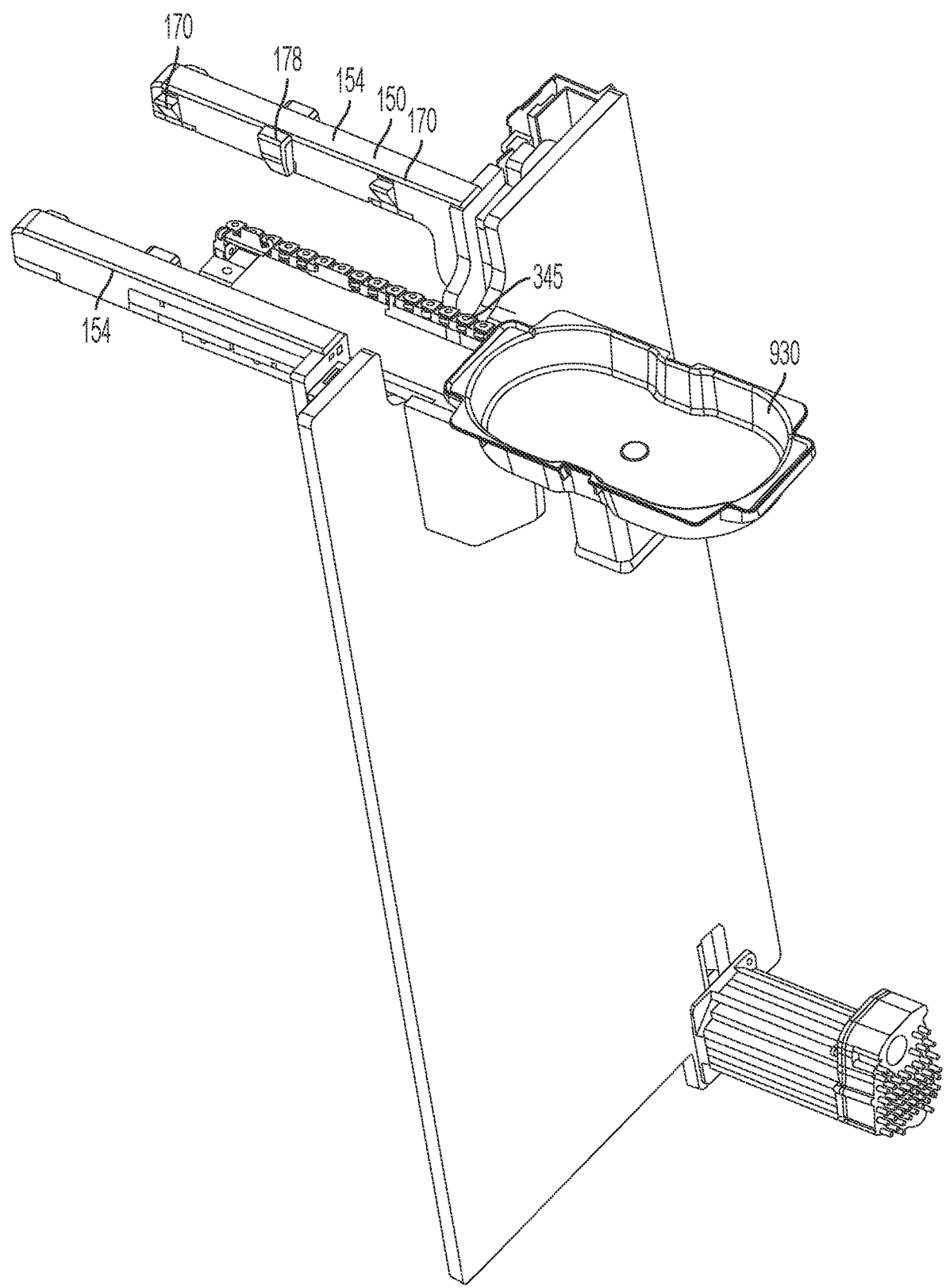
FIG. 5 is a perspective view of the shuttle of the system of FIG. 1, depicting the shuttle in the first position disposed to position a tray within the heated compartment, with the heated compartment removed in the figure.
Figure 6:
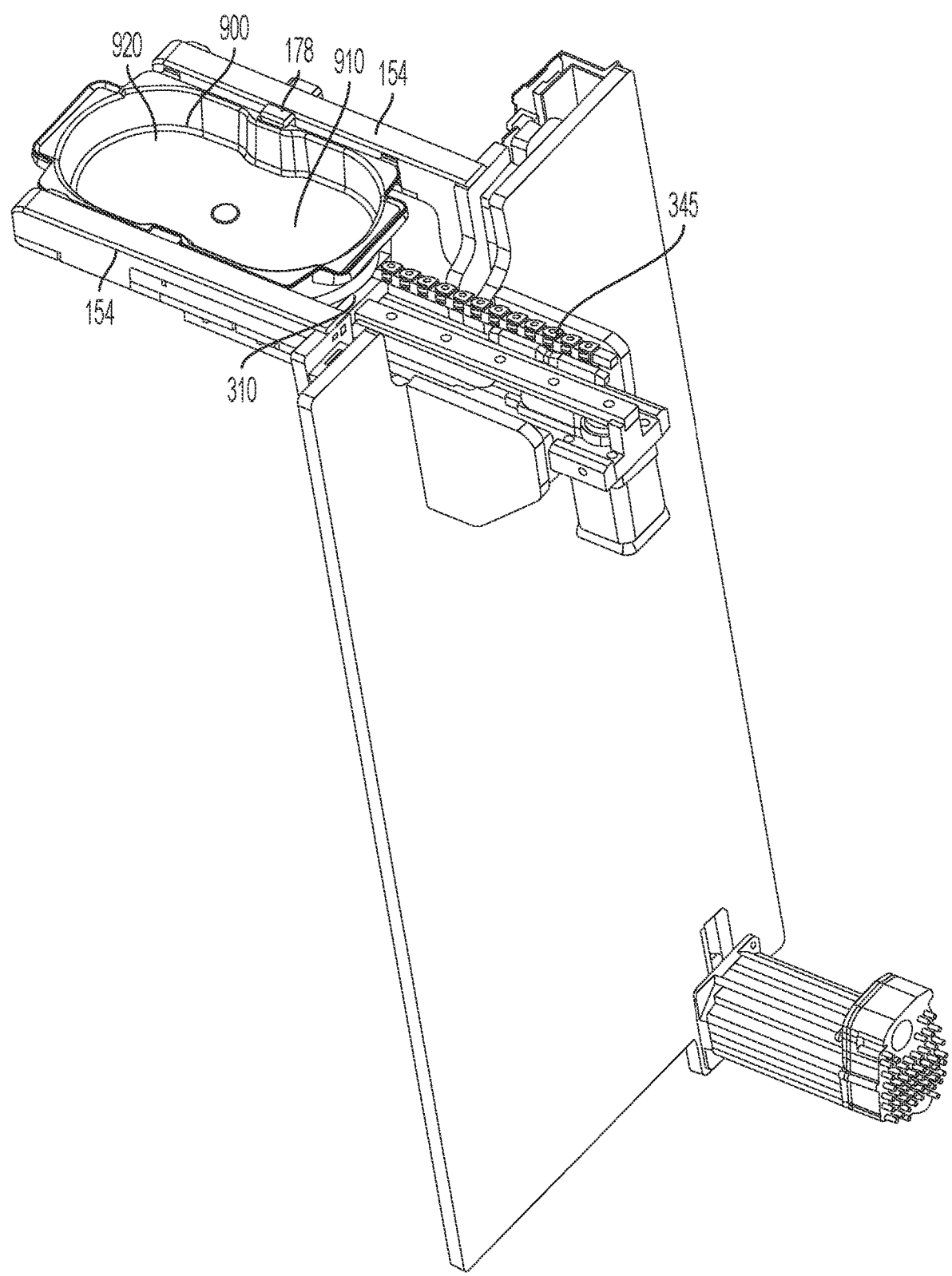
FIG. 6 is the view of FIG. 5 depicting the shuttle in the second position to align the tray to receive a cooked food product from a conveyor associated with a grill, as depicted schematically in FIGS. 22 and 23.
Figure 7:
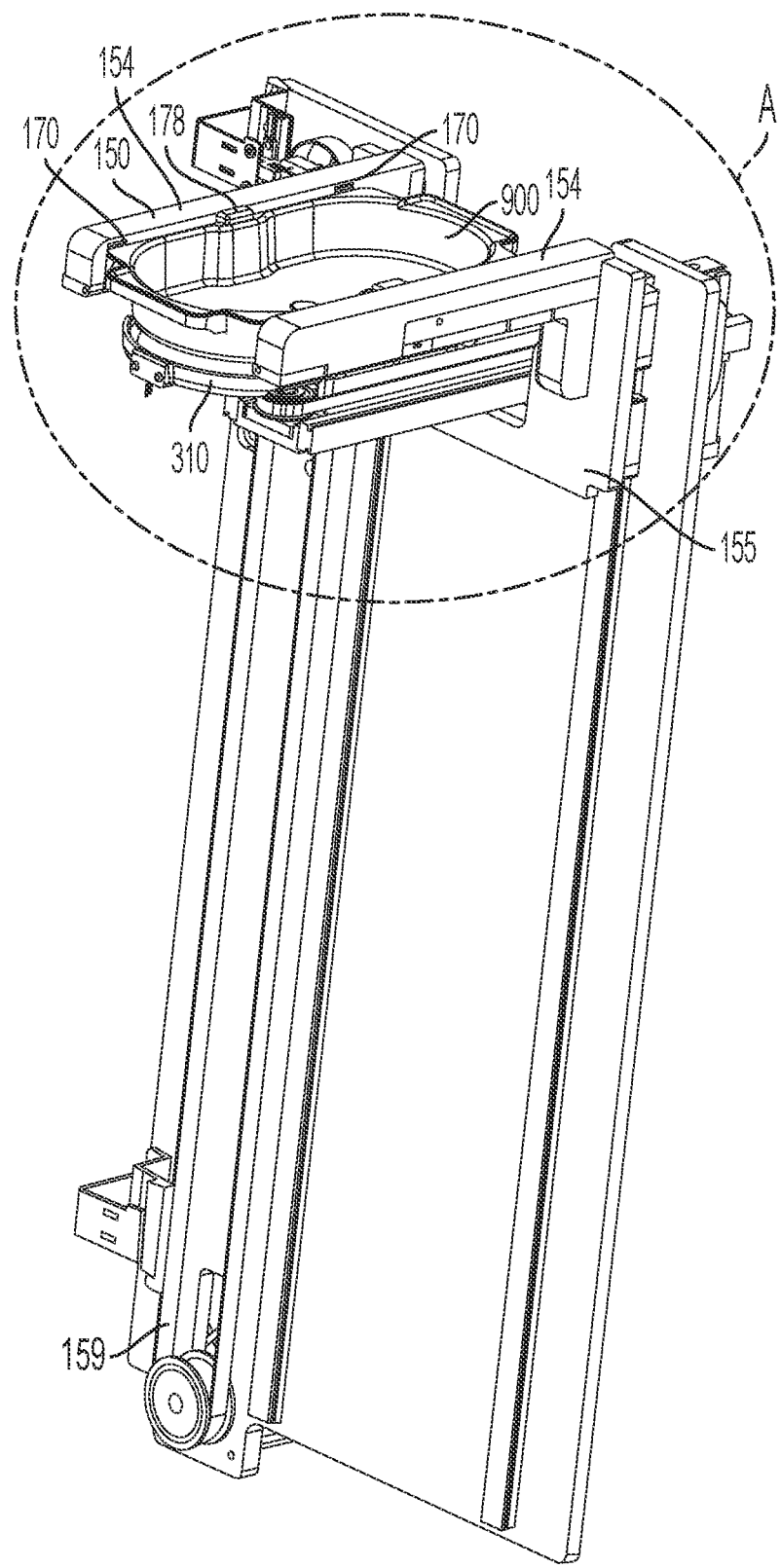
FIG. 7 is another perspective view of the shuttle in the second position.
Figure 8:
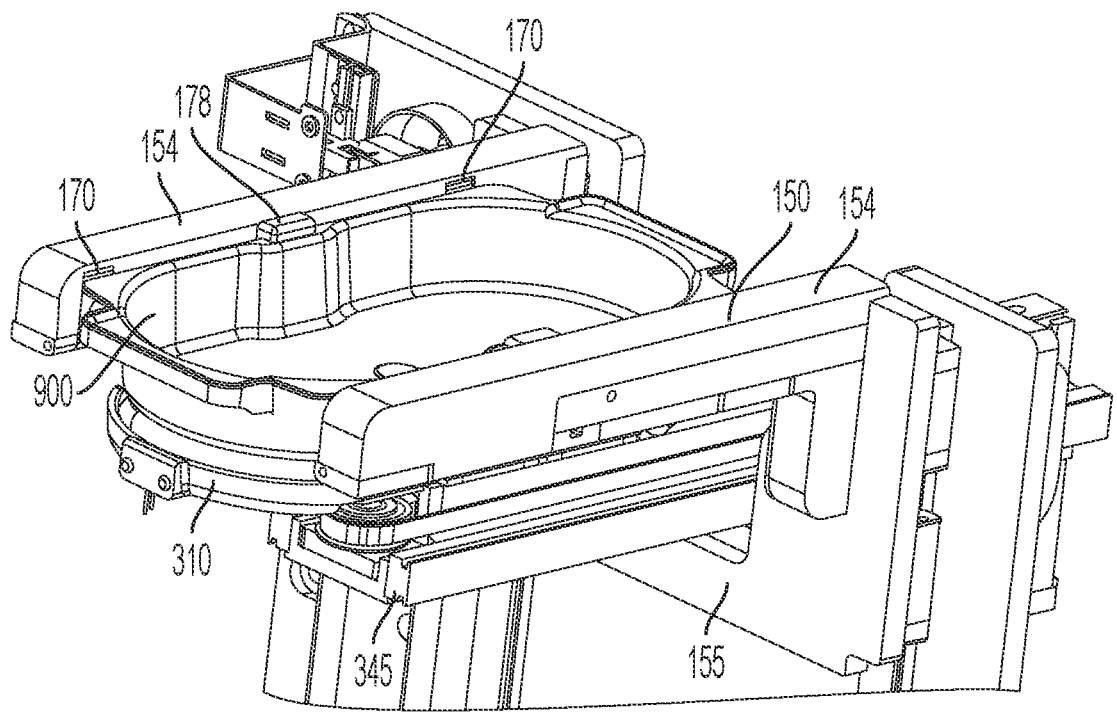
FIG. 8 is a detail view of detail A of FIG. 7.
Figure 22:
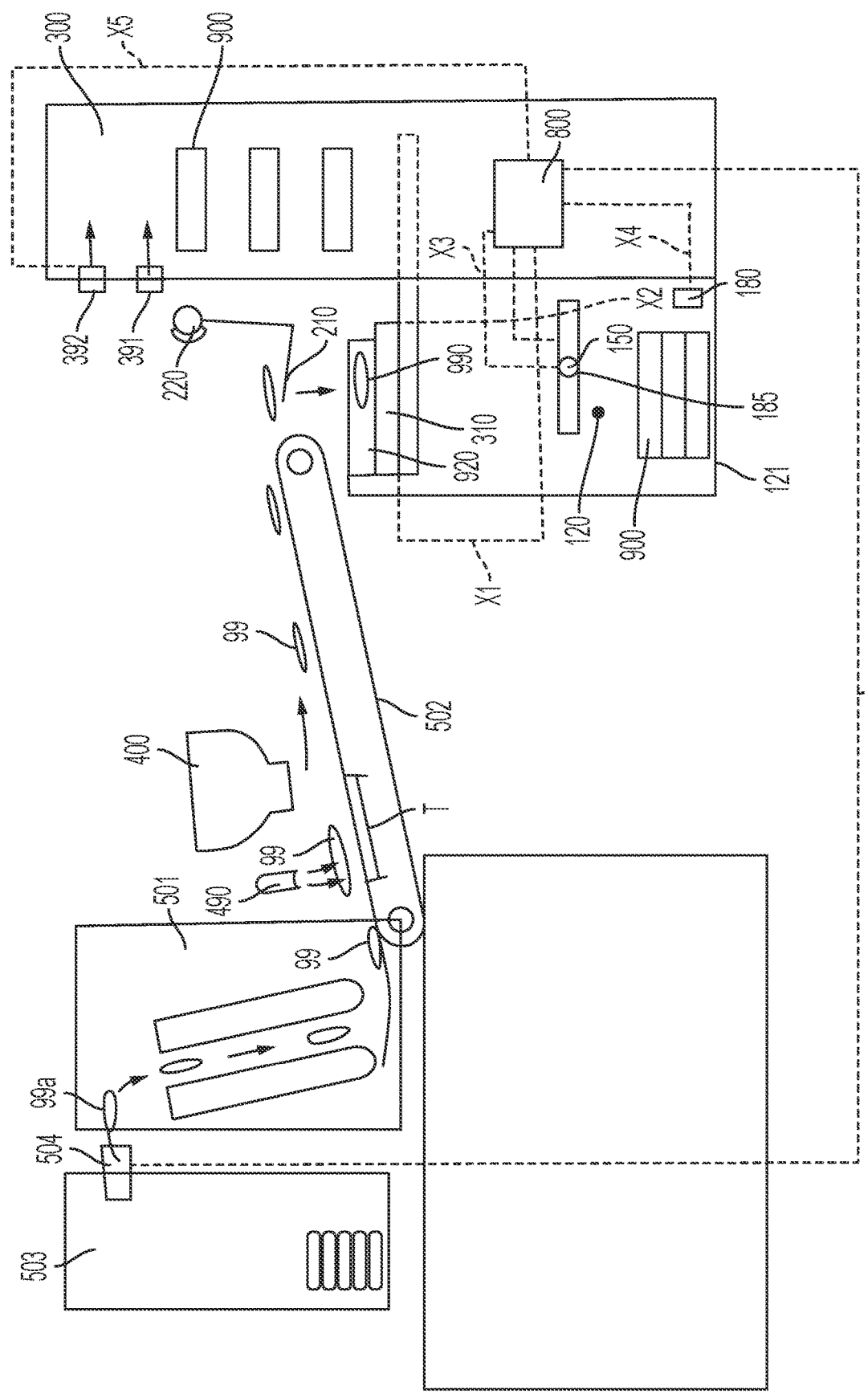
FIG. 22 is a schematic view of the system of FIG. 1 aligned to receive a cooked food products via a conveyor that is aligned to received cooked food products from a grill and a storage compartment, depicting the fork in the acceptance position.
Figure 23:
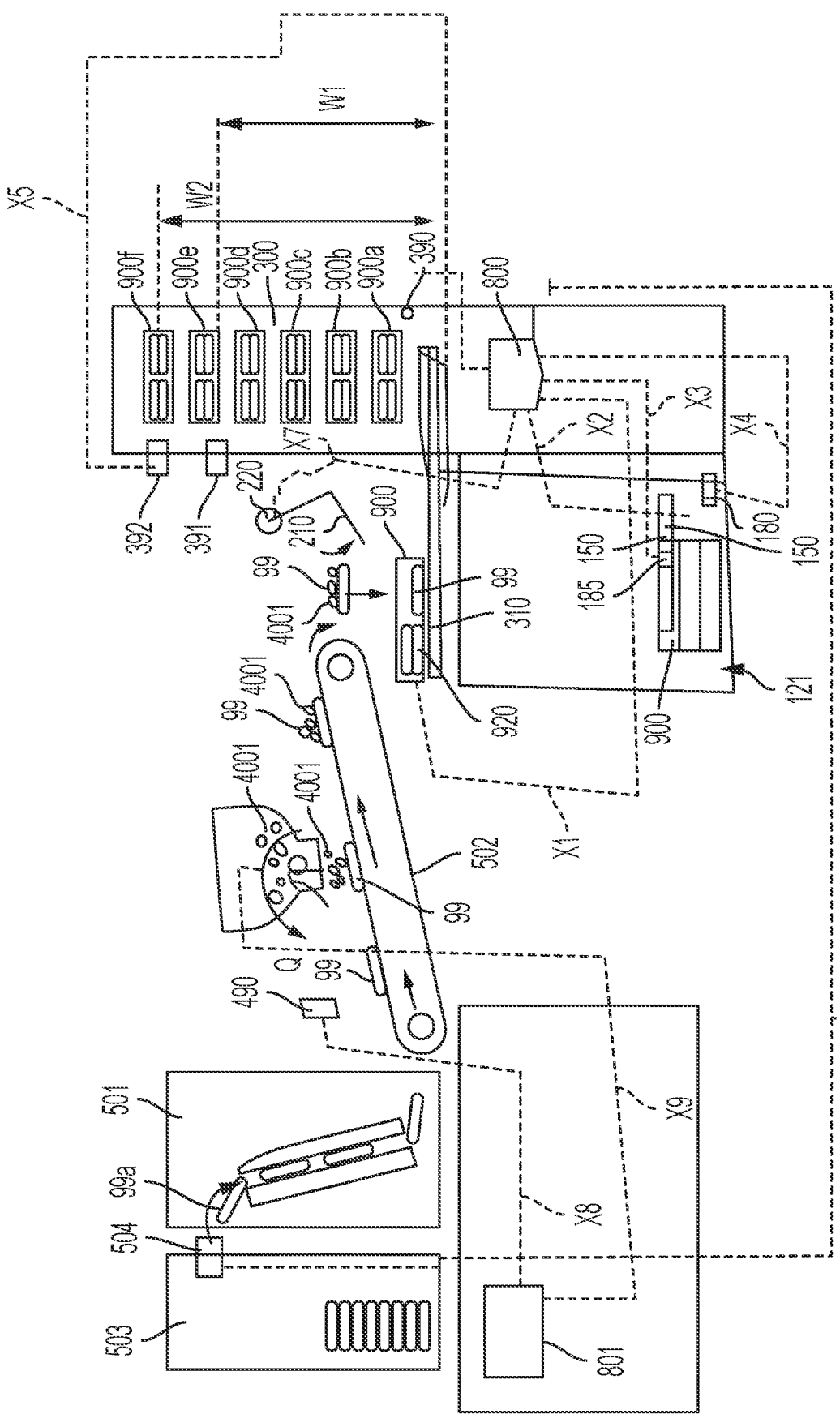
FIG. 23 is the view of FIG. 22 depicting the fork in the release position.

Turning now to FIGS. 3 and 4, a tray 900 for use with the system is provided. The tray includes a bottom 901 and a side wall 902 that extends upwardly from the bottom. The side wall 902 may be a height that is the same as or just larger than the combined thickness of the number of cooked food products 900 that are desired to be staked within the tray, such as just larger than the height of three, four, or five cooked food products (such as cooked hamburger patties, cooked chicken breasts, or cooked sausage patties) that are stacked on top of each other. In some embodiments, the tray 900 has first and second positions 910, 920 that are each configured to receive and support a stacked of cooked food products. As discussed below, the shuttle 310 is operated to align the tray 900 to receive cooked food products into either the first or second positions, as operated by a controller 800 (FIGS. 22, 23 depicted schematically, with line X1 showing a schematic communication between the controller 800 and the shuttle 310 to allow the relative position of the shuttle 310 and tray 900 to be controlled to receive the next cooked food product into the correct position within the tray 900, to cause the shuttle 310 to move to a first position (FIG. 5 to dispose the tray 900 within the heated compartment 300), and to work with the elevator 150 to position a new empty tray 900 to receive the next cooked food product—each of these steps is discussed further below.

The tray 900 further comprises a top surface 930 and an edge 930*a* that extends around the perimeter of the top surface 930, with the top surface 930 cantilevered from the sides of tray 900. In some embodiments, the top surface 930 defines voids 940 at two corners or at each of the four corners of the tray to receive the tracks 132, 134, 136, 138 as discussed below.

Figure 17:
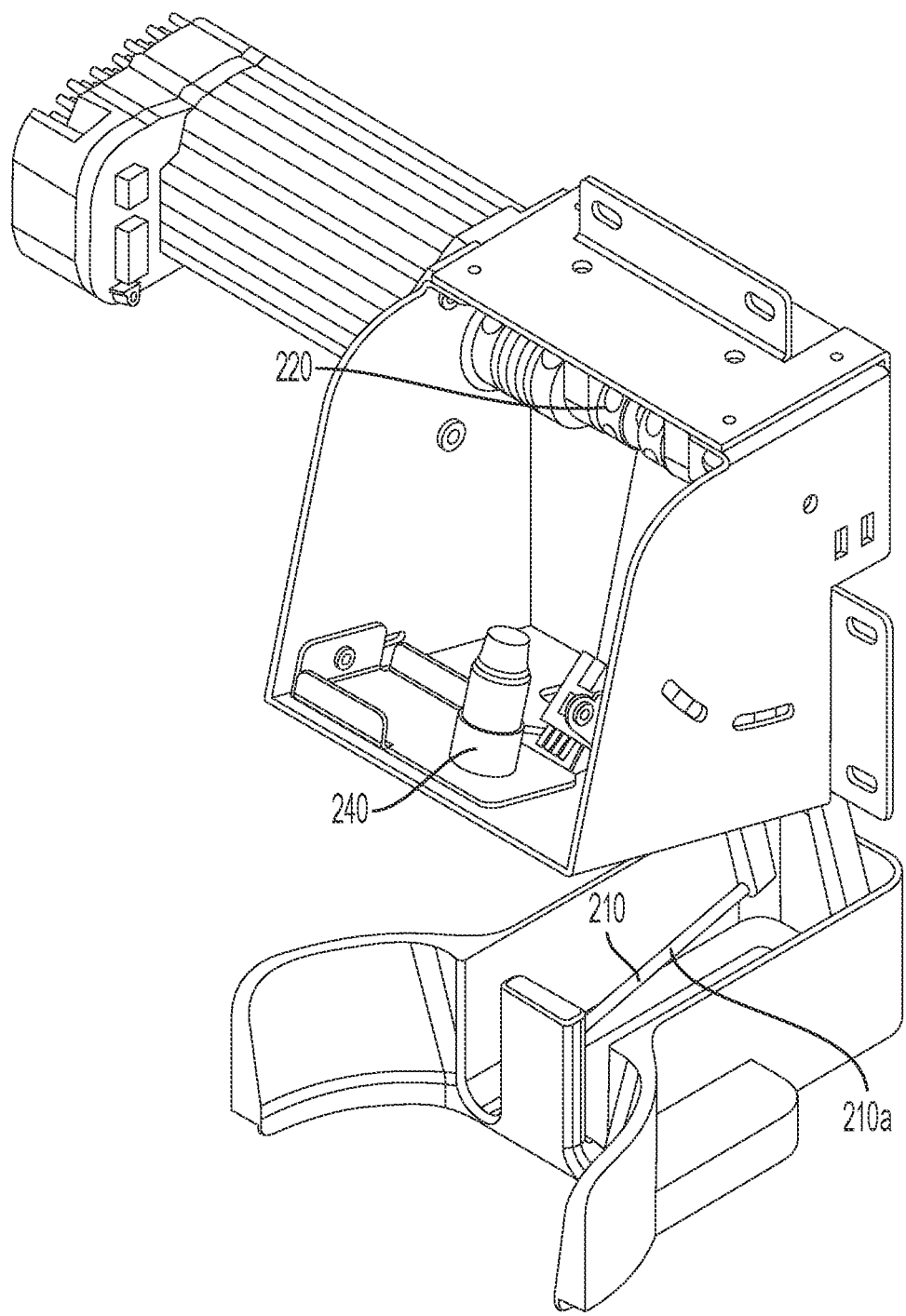
FIG. 17 is the view of FIG. 15 depicting the fork in the release position to allow a food product to freely fall into the tray.
Figure 18:
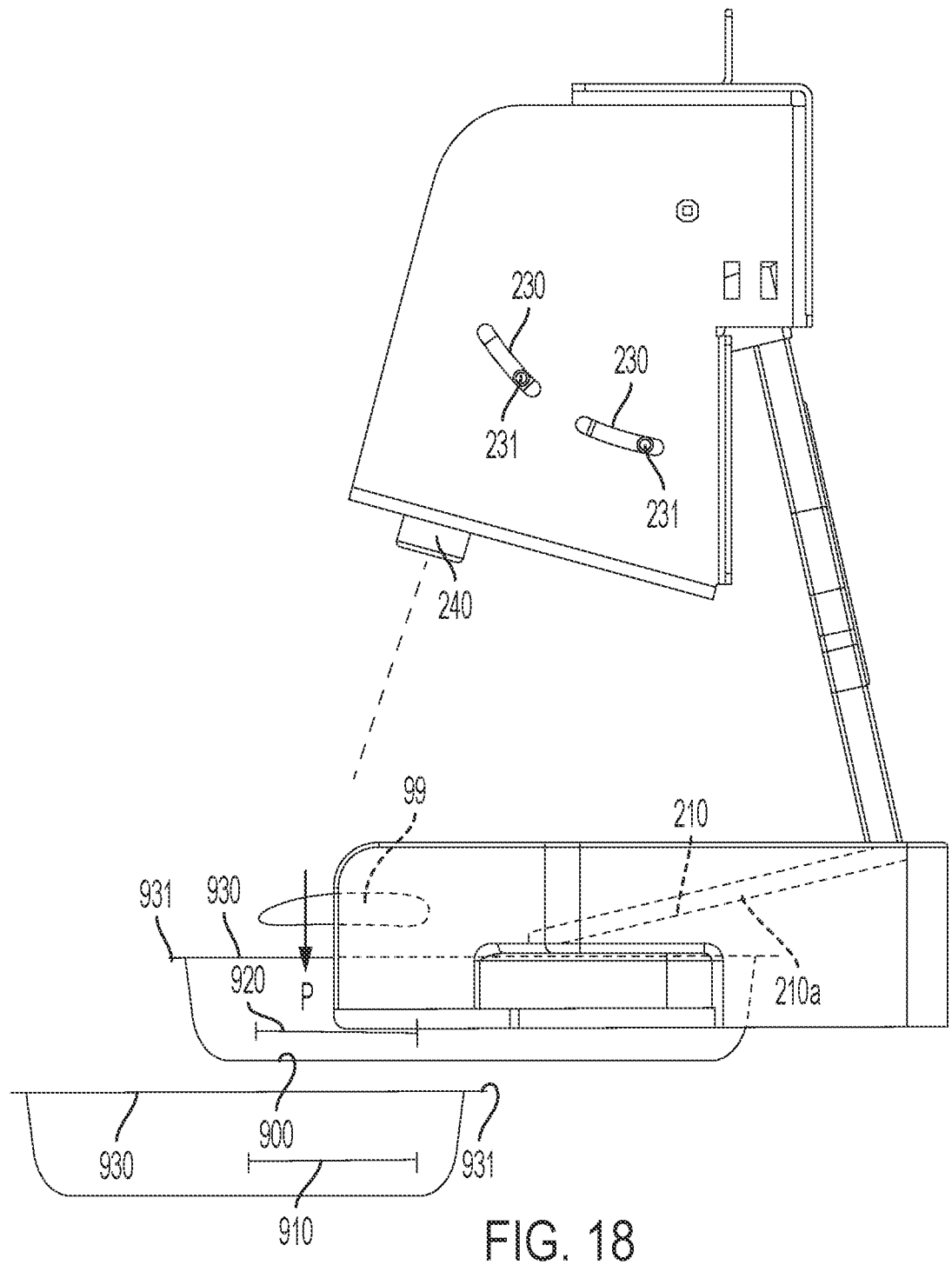
FIG. 18 is the view of FIG. 16 in the release position and schematically depicting two trays, one positioned to receive a cooked product in the first position upon the tray, and the second tray positioned to receive a cooked food product in the second positon upon the tray.

Turning now to FIGS. 15-18 the fork 210 may be provided. The fork 210 may include a single tine 210*a* or two or more tines 210*a*, such as three or four tines 210*a* or even more tines, which are each connected to an input 220. In some embodiments, the input 220 is rotatable and the rotation of the input 220 causes rotation of the tines 210*a* of the fork 210 between an acceptance position (FIGS. 15, 16) and a release position (FIGS. 17, 18). In some embodiments, housing of the fork may include one or more slots 230 that receive pins 231 from the input 220, wherein the movement of the input 220 is constrained by the shape and length of the slots 230.

In some embodiments, a sensor 240 is disposed proximate to the fork 210 and is configured to sense the presence of a cooked food product 99 above the fork 210. In embodiments with the sensor 240, the sensor 240, when sensing a cooked food product above or in contact with the fork 210 causes the input to rotate such that the tines 210*a* rotate from the acceptance position to the release position.

Rotation of the tines 210 toward the release position, preferably in a relatively rapid fashion, and preferably with an acceleration greater than the acceleration of gravity, causes the tines 210*a* to no longer support the cooked food product 99, which causes the cooked food product to fall downwardly in the direction P, and onto a tray 900 disposed below the fork 210 (depicted schematically in FIG. 18).

After the sensor 240 (or controller 800) determines that the cooked food product 99 has fallen below the fork 210, the input 220 rotates the tines 210*a* in the opposite direction to return the tines to the acceptance position so that the fork 210 is aligned to support another cooked food product 99 to maintain that another cooked food product 99 in the substantially horizontal orientation as it contacts the fork 210 and is then released from the fork 210 as discussed above. In some embodiments, the sensor 240 determines that the cooked food product 99 has fallen below the fork (due to directly sensing the vertical position of the cooked food product or by another manner of sensing) and then allows the fork (as urged by the input 220) to return to the acceptance position. In other embodiments, the fork 210 may be operated on a timer, such as to rotate the fork 210 to the release position and then return the fork 210 to the acceptance position a predetermined delay time after the fork is moved to the release position. In some embodiments, the sensor 240 may be laser that determines the presence of the cooked food product due to the cooked food product blocking the path of the laser. In other embodiments, the sensor may be an optical sensor, or heat sensor (sensing the heat of the cooked food product above the ambient temperature) or other sensors that are known in the art for performing the function of sensing a cooked food product in position with respect to the fork—and the types of sensors that can be suitably used for this application will be readily understood by one of ordinary skill in the art after a thorough review of this disclosure.

In other embodiments, a sensor may not be provided to directly monitor the position of the cooked food product above the tines 210*a* of the fork 210. Instead, the fork may be rotated based upon a sensor that senses a cooked food product traveling along a conveyor (502, FIGS. 22, 23) toward the fork 210 and may cause the fork to rotate after a predetermined delay time after that determination based upon the speed of the conveyor 502. In other embodiments, the fork 210 may be rotated from the acceptance position to the release position when the force of the cooked food product falling onto the tines 210*a* is sensed upon the tines.

Figure 16:
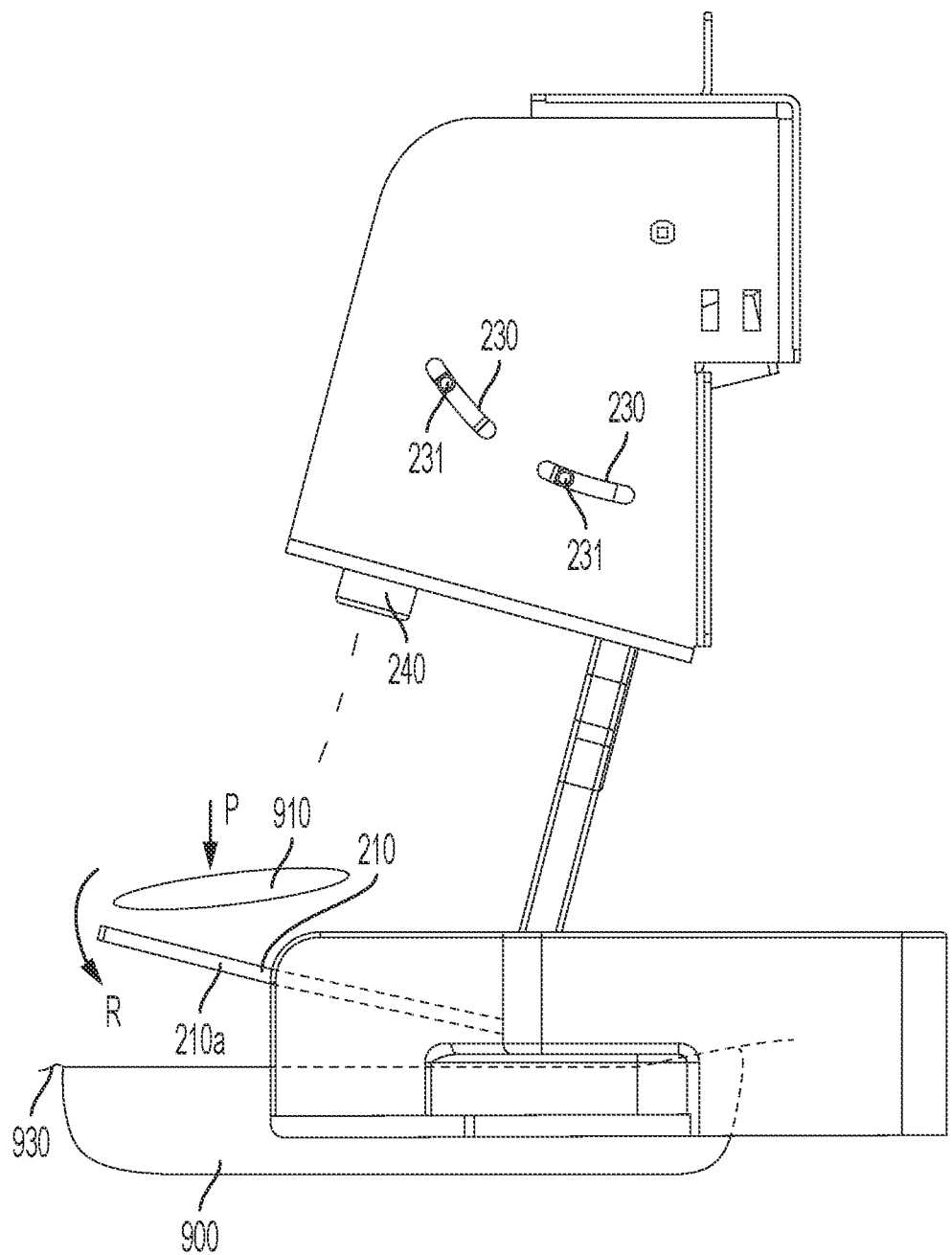
FIG. 16 is a side view of the fork and associated mechanism in the acceptance position.
Figure 16A:
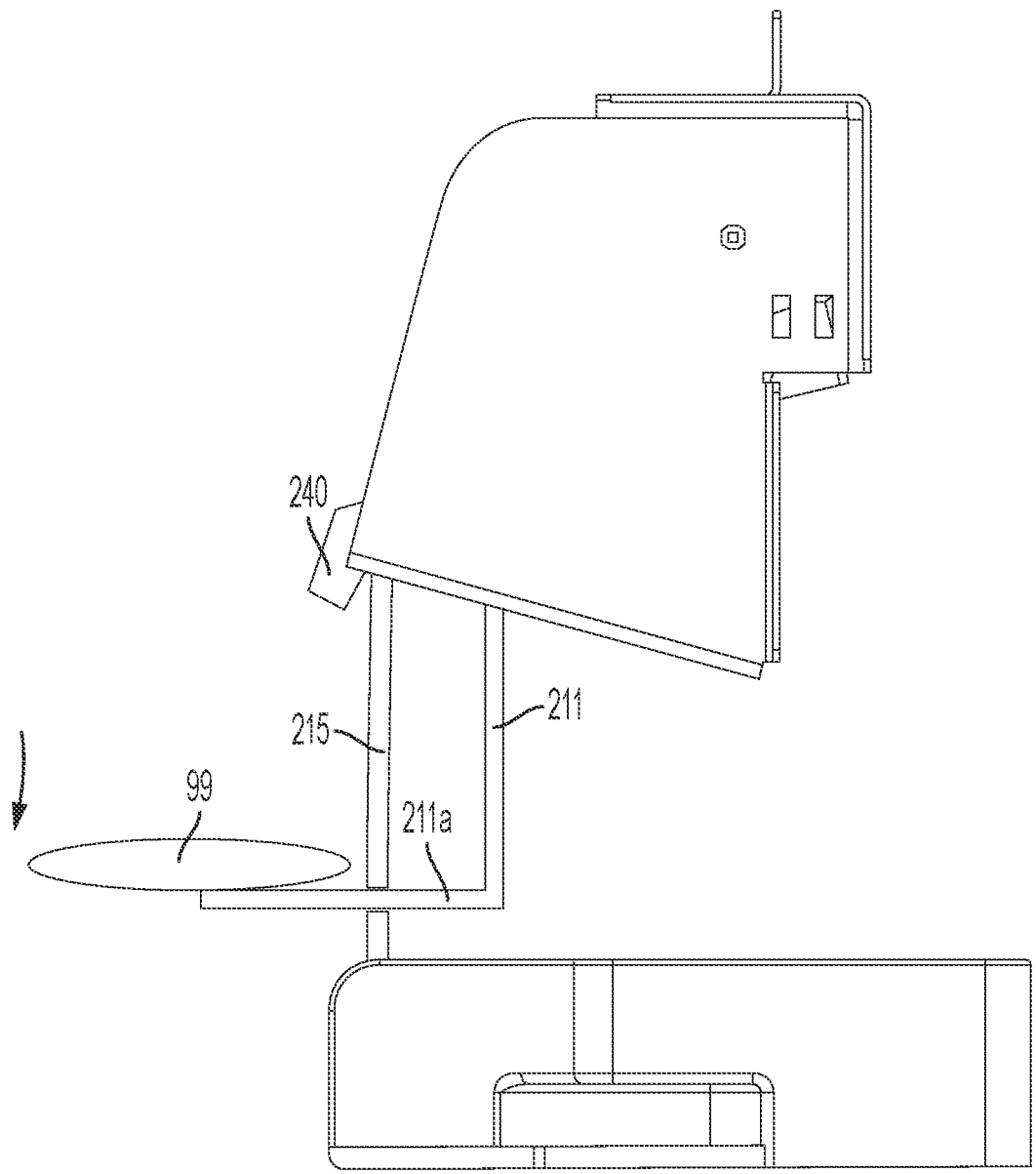
FIG. 16a is a side view of another embodiment of the fork in the acceptance position.
Figure 18A:
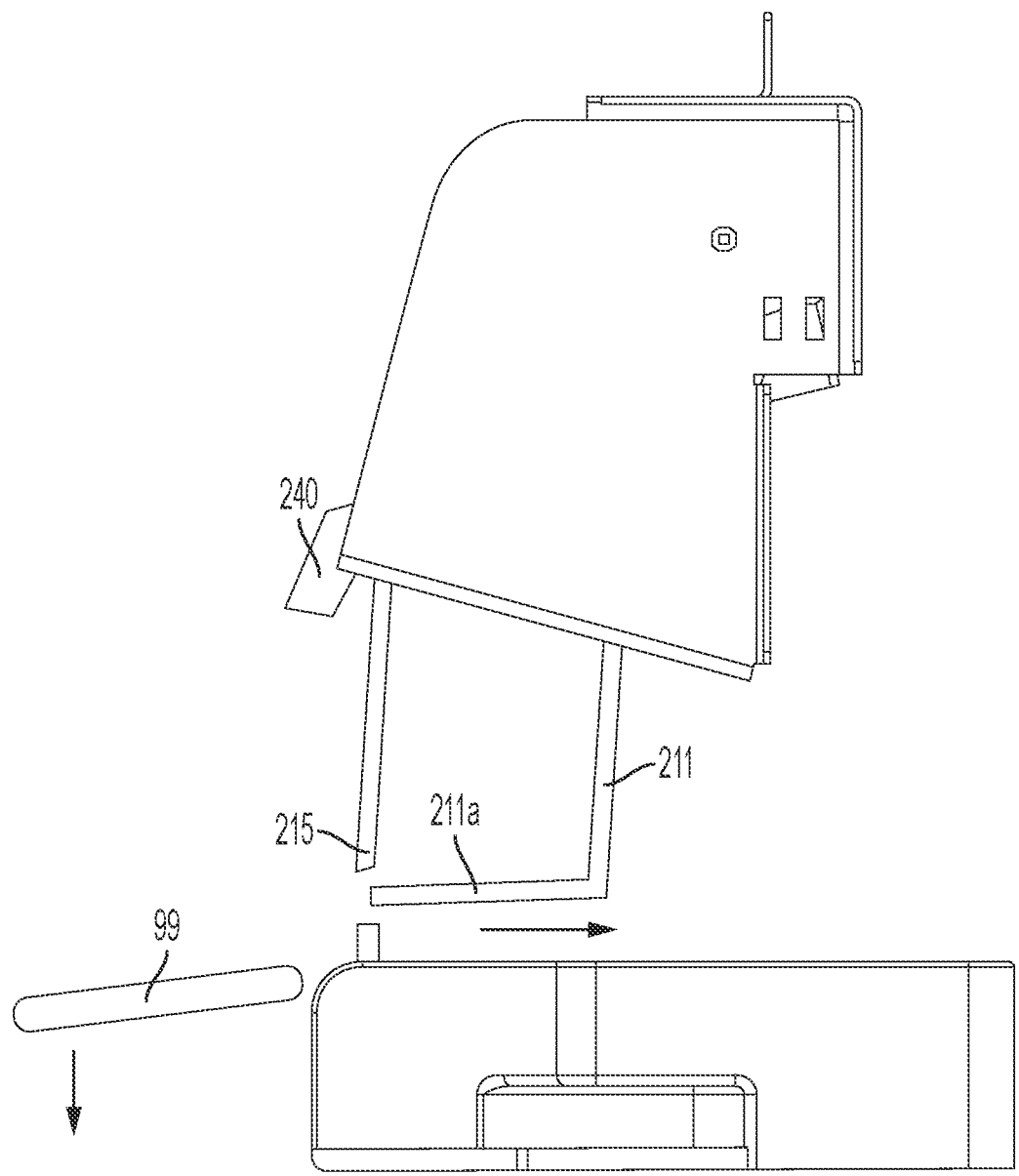
FIG. 18a is the view of 16a showing the fork in the release position.

In other embodiments depicted in FIGS. 16*a* and 18*a*, tines 211*a* of an alternate fork 211 may be translated horizontally between an acceptance position (FIG. 16*a*) and a release position (FIG. 18*a*). When the falling cooked product 99 initially falls onto the tines 210*a* the cooked food product 99 is initially maintained in or restored to a substantially horizontal configuration. The tines 211*a* then horizontally retract from under the cooked food product 99, which allows it to fall, while maintaining its substantially horizontal orientation, toward a tray 900. In some embodiments, a wall 215 may be positioned proximate to where the cooked food product 99 falls onto the tines 211, the cooked food product 99 initially bearing against the wall 215 as the tines are retracted horizontally away from under the cooked food product 99 to maintain the cooked food product in the appropriate position.

Figure 13:
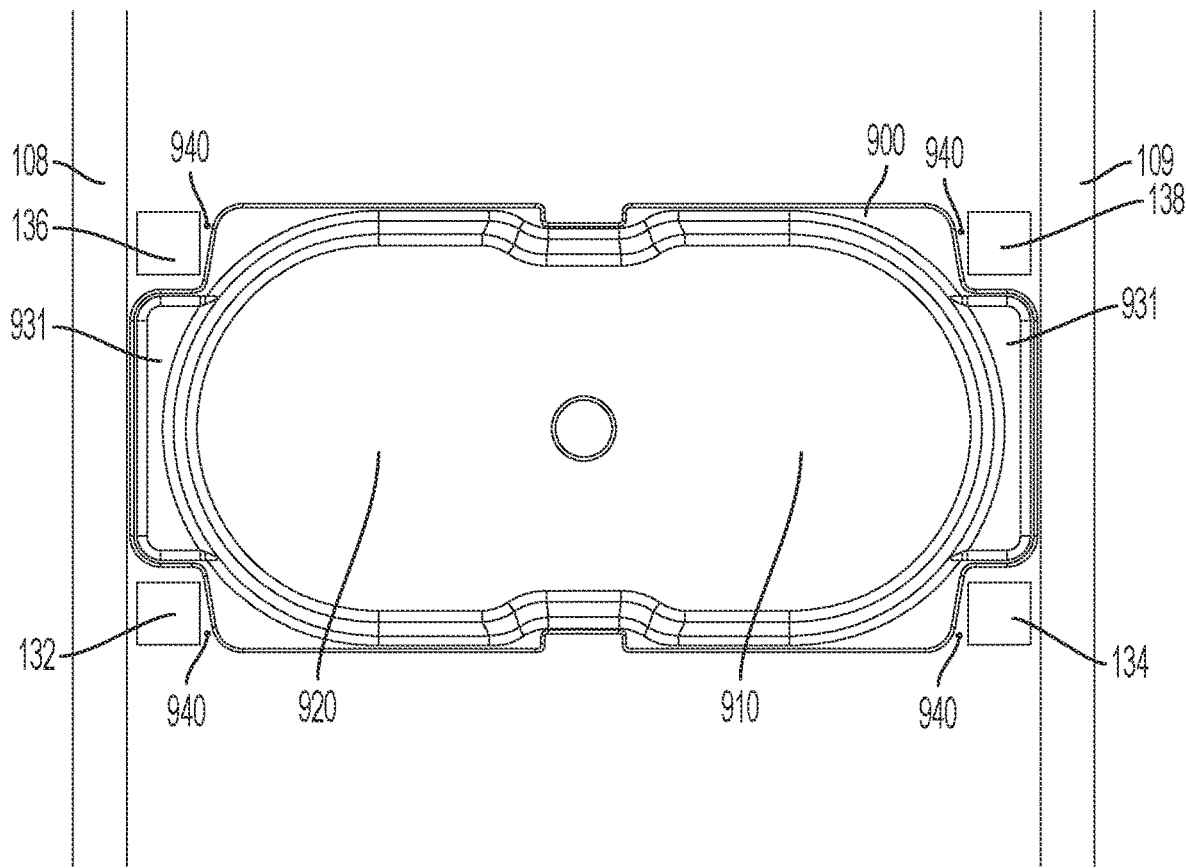
FIG. 13 is a top view of the tray within the enclosure, depicting the tracks disposed within the voids formed at the corners of the tray.

Turning now to FIGS. 5-12, the shuttle 310 is provided. The shuttle 310 is configured to move a tray 900 between the first position (FIG. 5) where the tray is disposed within the heated compartment 300, and a second position (FIGS. 6-12, 18) where the tray 900 is disposed outside of the heated compartment 300 and aligned to receive a cooked food product 99, in some embodiments as assisted by the fork 210, for storage thereon. As discussed elsewhere herein, the shuttle 310 communicates with the controller 800 to maintain the tray aligned in the second position to receive cooked food products until either the tray is determined to be full, or until the user or controller 800 desires to transition the tray into the heated compartment, such as based upon one or more recipes as directed by the controller 800 or based upon the needs of the user. In some embodiments, the tray 900 is configured to receive cooked food products 99, either single cooked food products 99 or in stacks of various numbers of cooked food products 99, in two positions upon the tray 910, 920. FIG. 18 shows two trays 900 schematically aligned to receive food products into the two positions 910, 920 and the two positions are depicted in FIGS. 3, 4, and 13. In this embodiment, the shuttle 310 is configured to slide the tray with respect to the fork 210 to selectively receive the cooked food products 99 upon the two positions 910, 920.

The shuttle 310 may include a platform 308 upon which the bottom 902 of the tray 900 rests. The shuttle 310 may include end walls 305 that extend upwardly from the platform 308 to provide positioning support for the tray 900 to prevent the tray 900 from sliding upon the platform 308. The end walls 305 may be arcuate to match the end profile of the bottom portion of the end walls of the tray to provide lateral support to the tray in all horizontal directions. In some embodiments, the platform 308 may include scallops 309 on both sides thereof, which allow the ledges 350, 352 of the belts 340, 342 to move therethrough to allow the ledges 350, 352 to lift the tray 900 off of the platform 308 when the shuttle 310 is in the first position within the heated compartment. The scallops 309 additionally provide room for the fingers 170 and hubs 178 of the elevator to extend therethrough as the elevator 150 moves with respect to the tray 900 and the shuttle 310.

The shuttle 310 may translate within the housing 110 between the first and second positions (and between two or more tray alignment positions within the second position as discussed above) with a belt drive, a chain drive, a lead screw, a linear actuator, a piston, or by another directed movement system 345. The controller 800 may be in communication with the shuttle 310 to direct motion of the shuttle as shown schematically as communication flow X2 in FIGS. 22 and 23.

Figure 10:
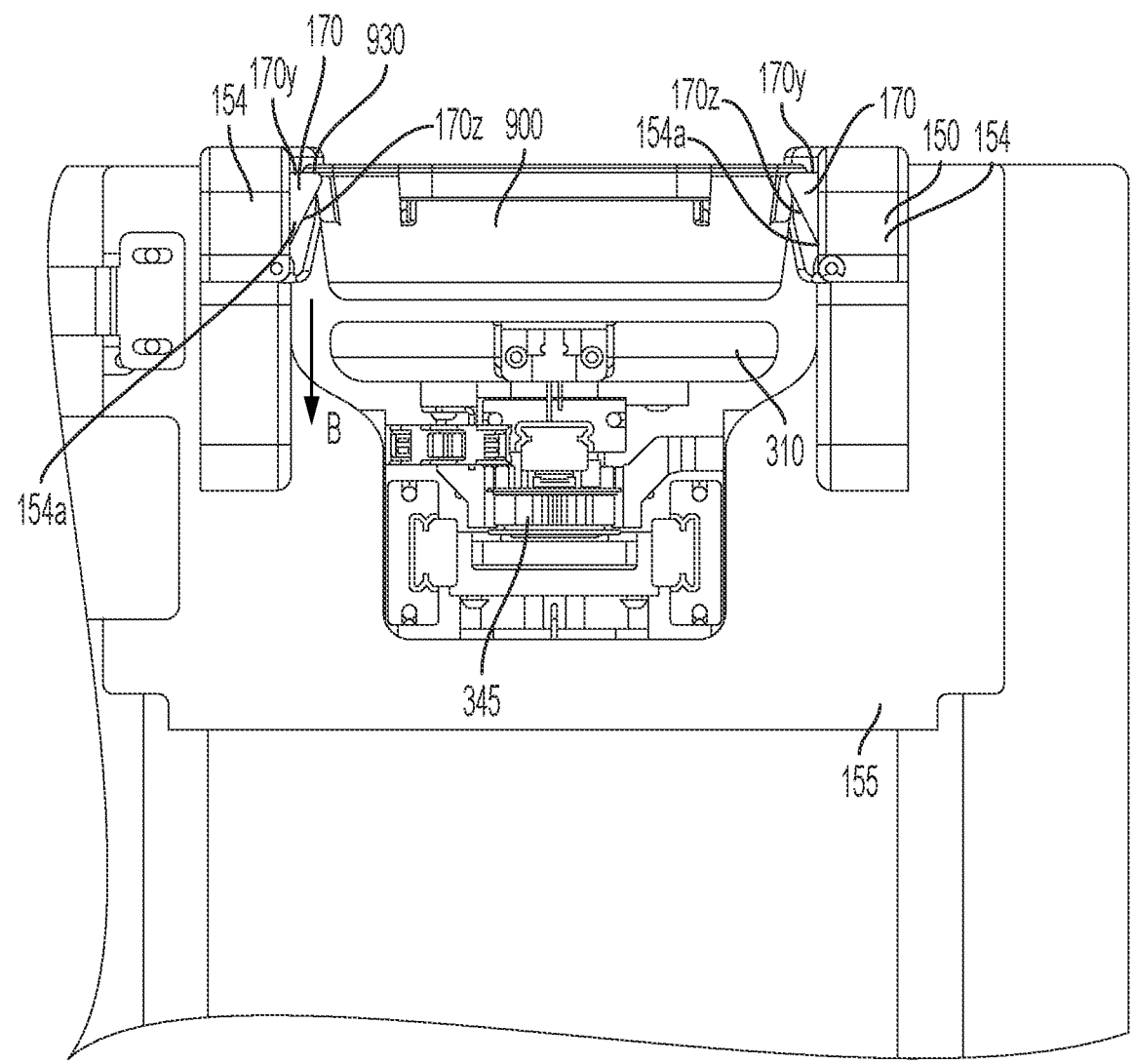
FIG. 10 is a front view of the shuttle and elevator depicting the elevator supporting a tray spaced upwardly from resting upon the shuttle.
Figure 11:
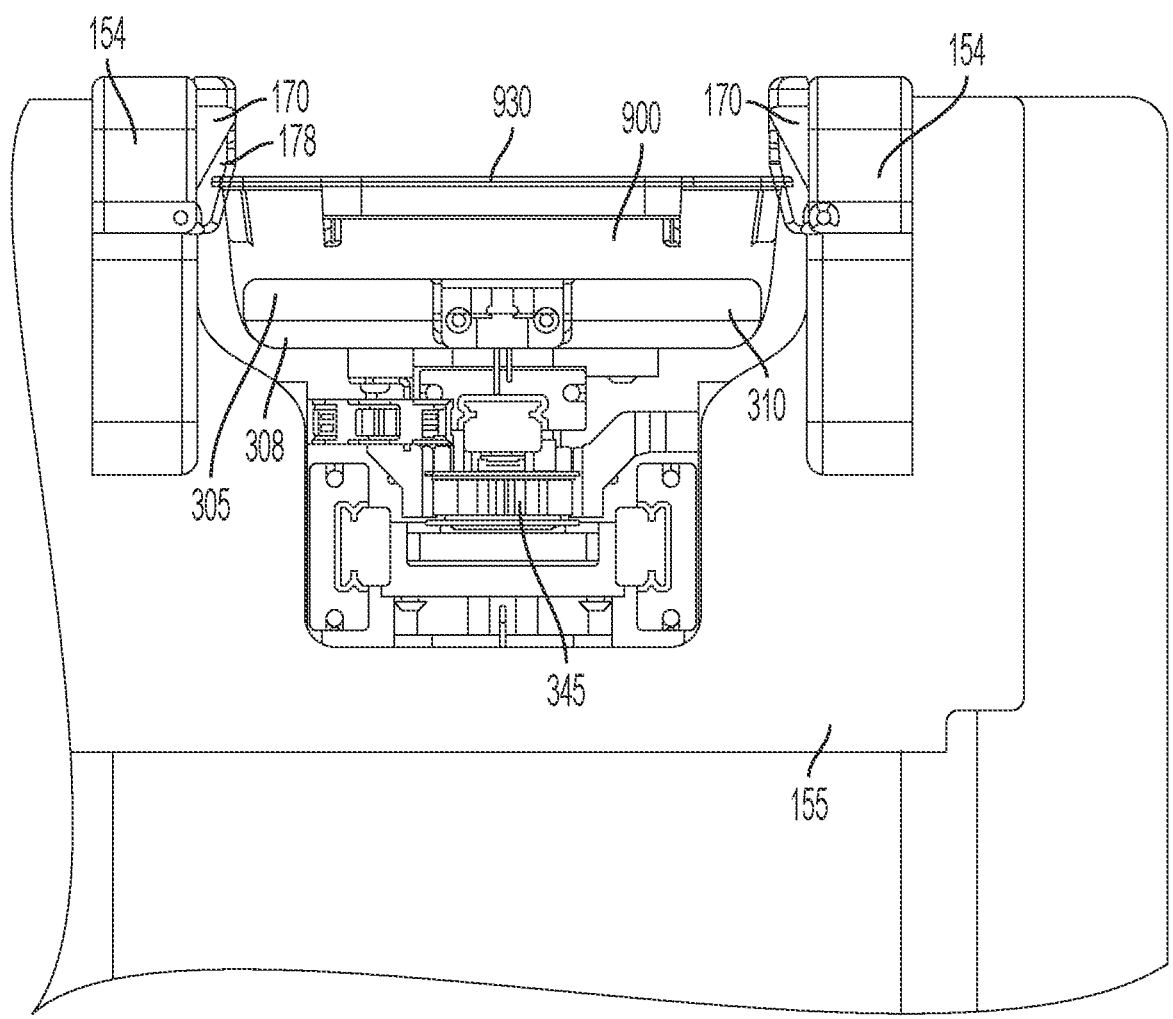
FIG. 11 is the view of FIG. 10 depicting the tray below the elevator and resting upon the shuttle.
Figure 12:
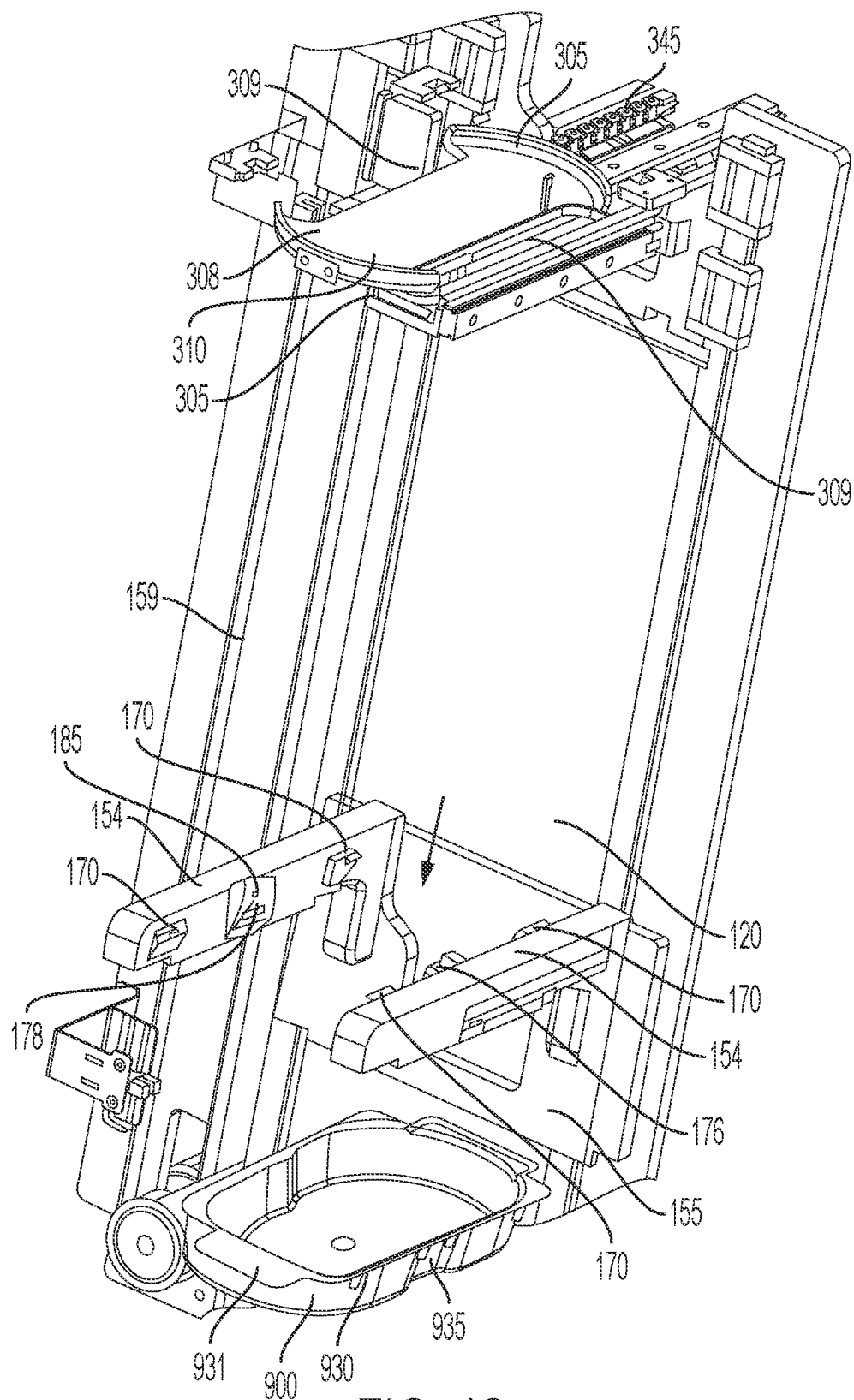
FIG. 12 is another perspective view of the shuttle and the elevator, depicting the elevator lowering to approach a tray resting upon the floor of the enclosure.

As discussed in detail below, the shuttle 310 may receive a tray 900 when dropped or other otherwise positioned thereon from the elevator 150. FIG. 10 depicts a tray 900 positioned upon the elevator 150 and disposed vertically above the platform 308. FIG. 11 depicts the tray 900 disposed upon the platform 308 having been dropped from the elevator 150, as discussed below. As can be understood with reference to FIG. 11, the shuttle 310 may slide from the second position to the first position with a tray thereon with the arms 154 of the elevator 150 disposed above the tray due to the space between the platform 308 and the arms 154 of the elevator 150.

The shuttle 310 as described in this specification moves to a first position where the tray 900 upon the shuttle is disposed within a heated compartment 300 (discussed below). In other embodiments, a heated compartment need not be included in this assembly and the shuttle 310 may slide to move the full tray 900 away from below the fork 210, such that another empty tray 900 can be positioned upon the shuttle when the shuttle returns to the second position. In these embodiments, the system may be operated such that the user pulls the full tray off of the shuttle 310, or the shuttle 310 leads the tray to another transport system, such as a conveyor to a food preparation station, or to a heated holding device that is disconnected from the system 100 that includes the shuttle 310.

The elevator 150 is best shown in FIGS. 7-12. The elevator 150 is provided to lift trays 900 that are provided upon the floor 121 of the enclosure 120, or to lift the top tray of a number of stacked trays 900 within the enclosure, into a position where the tray 900 can be dropped or otherwise positioned upon the platform 308 of the shuttle as understood with reference to FIGS. 10 and 11.

Figure 9:
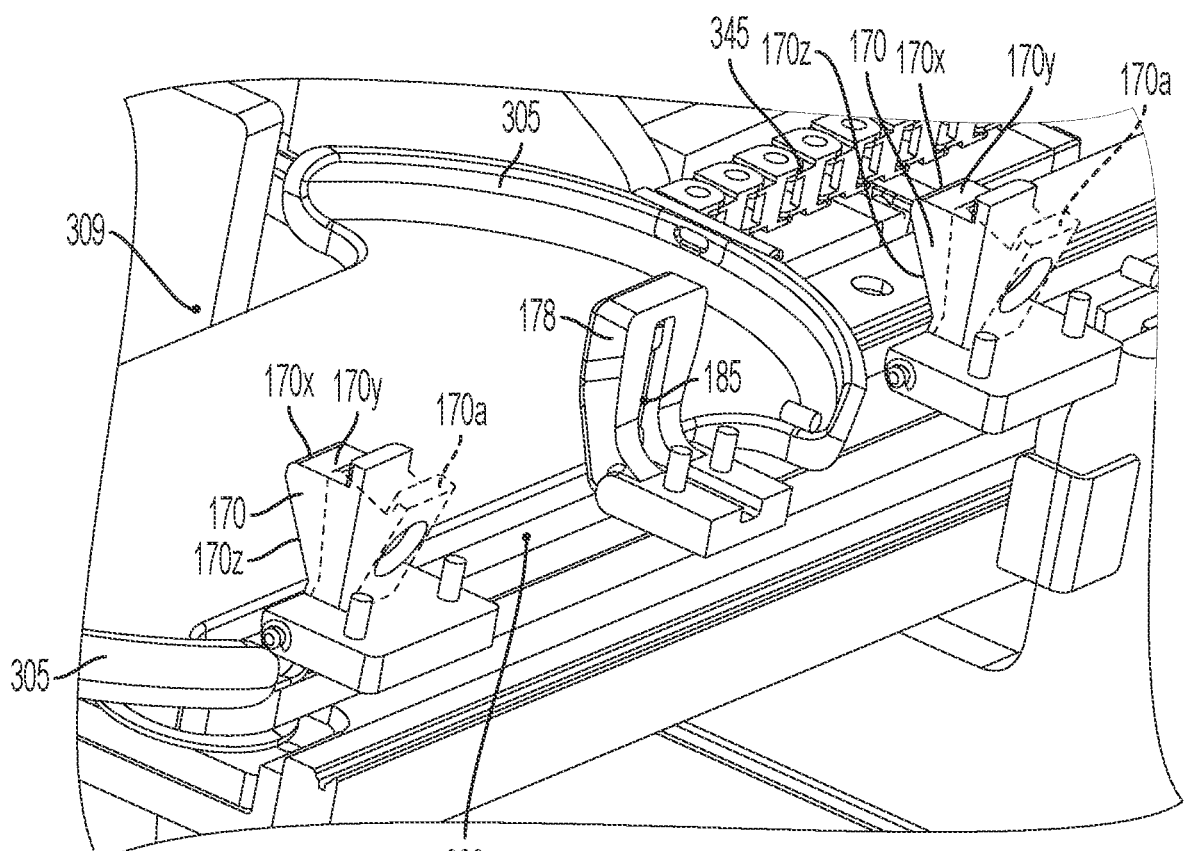
FIG. 9 is a view depicting the fingers of the elevator in a position to engage and support a tray (not shown) in solid lines and depicting the fingers in a withdrawn position in broken lines to allow the tray to pass vertically past the fingers and depicting the shuttle without a tray resting thereon.

The elevator 150 includes first and second arms 154 that extend horizontally and in a cantilevered manner with respect to a side wall 109 of the housing 110 that defines the enclosure 120. The first and second arms 154 may both be supported by a bracket 155 that is moved upwardly and downwardly such that the vertical position of the first and second arms 154 move correspondingly upwardly and downwardly. The bracket 155 (and arms 154) may be moved with a belt drive, a chain drive, a lead screw, a linear actuator, a piston, or by another directed movement system 159. The controller 800 may communicate with the elevator 150 via a signal path depicted schematically as X2 to allow the controller 800 to control the vertical position of the elevator 150 and in some embodiments to control the position of the plurality of fingers 170 as discussed below. The controller 800 may further receive a signal X3 representative of whether a tray 900 is disposed between the first and second arms 154, as monitored by a sensor 185 (FIG. 9). As discussed in detail below, this signal X3 may be used by the controller 800 to allow or prevent operation of the grill 501 in embodiments where the operation of the grill 501 is controlled in conjunction with the operation of the system 100.

The first and second arms 154 may each support one or two or more fingers 170 that are pivotable with respect to the arms 154. The fingers 170 may be biased toward a position where they extend out of the inner surface 154*a* of each arm as shown in FIGS. 9 and 10. The fingers 170 may retract (either manually based upon receipt of a force thereon, or automatically via a mechanism) such that the fingers 170 are recessed within the respective first and second arms 154 as shown schematically in broken lines and as designated as element 170*a*.

As depicted in FIG. 10, the fingers 170 each may include a cam surface 170*z* and a top surface 170*y*. The top surface 170*y* extends horizontally when the respective finger 170 is in the normal biased outward position (solid lines in FIG. 9), and the cam surface 170*z* extends from an outer edge 170*x* of the top surface 170*y* and extends inwardly toward the bottom of the finger 170.

As depicted in FIG. 10, when the arms 154 of the elevator 150 support a tray, the surface 930 of the tray rests upon the top surfaces 170*y* of the fingers. In some embodiments, the fingers 170 may automatically retract within the arms 154 (as directed by the controller, such as via the schematic signal X2), which causes the fingers 170 to clear outwardly from the outer edge of the surface 930, which allows the tray to fall to the platform 308 of the shuttle 310. In other embodiments, the arms 154 may move downward in the direction B to allow the tray 900 to rest upon the platform 308 of the shuttle 310.

After the tray 900 has been dropped from the arms 154 (by retracting the fingers 170 to position 170*a*), or in other embodiments the arms 154 lowered to place the tray upon the platform 308, the arms 154 may be lowered past and below the shuttle 310 and tray 900 and continue being vertically lowered through the enclosure 120 to approach a tray 900 that either rests upon the floor 121 of the enclosure 120 or to approach the top tray 900 in a stack of trays (as schematically depicted in FIGS. 22 and 23.

As the elevator approaches and initially contacts a tray 900 disposed within the enclosure 120, the fingers 170 and specifically the cam surface 170*z* of each finger 170 contacts the outer edge of the surface 930 of the tray, with one or more fingers 170 from the opposing arms 154 contacting the outer edge of the surface 930 simultaneously to maintain the alignment of the tray 900 within the enclosure 120. As the cam surface 170*z* contacts the outer edge, the fingers 170 are each urged inwardly into the arms 154 due to the cam surface 170*z* contacting the outer edge and applying a horizontal force to the fingers, which pushes the fingers into the arms 154 against the outward biasing force of the fingers 170.

As the arms 154 continue to move downwardly with respect to the tray 900, the fingers 170 continue inwardly within the arms (toward a position depicted as 170*a* in FIG. 9) until the fingers 170 are disposed below the surface 930 of the tray upon which time the inward force upon the fingers 170 is released and the fingers are allowed to move outward to their normal outward biased position (identified as 170 in FIG. 9). In this position, the top surface 170*y* of the fingers are below the surface 930 of the tray 900 which allows the elevator to lift the tray upwardly through the enclosure 120 as the elevator is raised 150 within the enclosure 120. In some embodiments, while a tray 900 is still disposed upon the platform 308 of the shuttle 310 and the elevator 150 has picked up a new tray from the enclosure, the elevator 150 may be positioned within the enclosure 120 and proximate to the bottom of the shuttle 310, such that the elevator 150 need only move a short distance upward, when the shuttle 310 moves to the first position to position its tray 900 within the heated compartment 300. Once the shuttle 310 moves to the first position, the elevator 150 moves to the position of FIG. 10 allowing clearance for the shuttle 310 to move to the second position, and upon the shuttle 310 returning to the second position the elevator releases its tray by withdrawing the fingers 170 within the arms 154 as described above.

In some embodiments, one or both of the arms 154 may support a hub 178 which is aligned within a void 935 (FIG. 4) within the outer edge of the surface 930 of the tray 900 when the arms 154 of the elevator are positioned about the tray 900. The hub 178 may provide lateral support for the tray 900 upon the arms 154. In some embodiments, the hub(s) 178 may support a sensor 185 that monitors when the elevator is aligned with a tray 900. The sensor 185 may send a signal X3 (FIGS. 22, 23) to the controller that is representative of this alignment. The signal X3 may be used by the controller to stop downward motion of the elevator 150 within the enclosure 120 due to the proper alignment of the tray with the elevator 150. In some embodiments, the sensor 185 is positioned such that the sensor establishes the proper position of the elevator 150 with respect to the tray when the fingers 170 are positioned below the surface 930 of the tray 900 such when the elevator 150 begins to move upwardly within the enclosure 120 the elevator 150 will lift the tray 900 within the enclosure.

Figure 14:
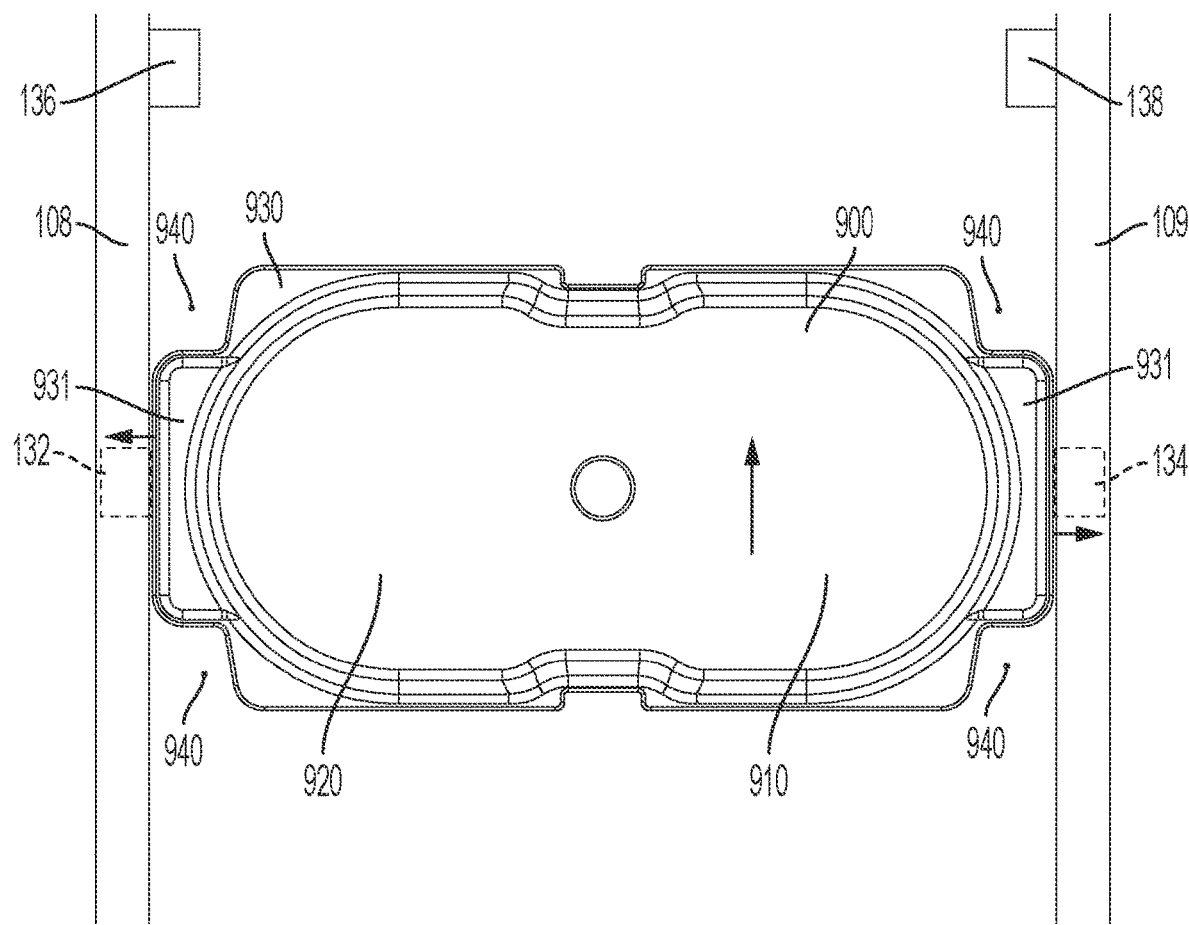
FIG. 14 is another top view of the tray within the enclosure, depicting the tray sliding horizontally within the enclosure and the outer edge of the tray pushing the front rails inwardly into the side walls that define the enclosure to allow the tray to slide therepast.
Figure 15:
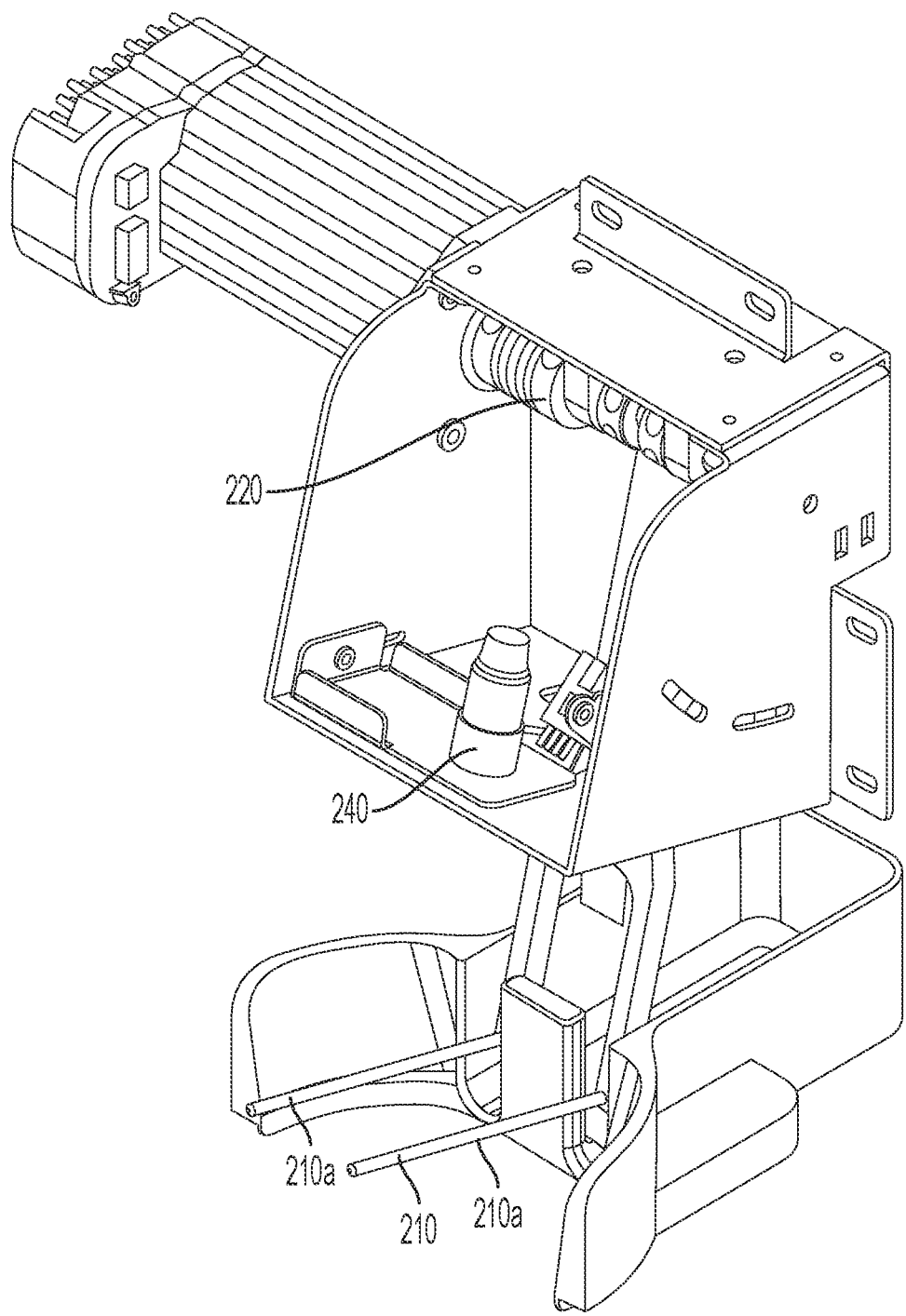
FIG. 15 is a perspective view of the fork and associated rotation mechanism depicting the fork in the acceptance position to guide a cooked food product from a conveyor toward a tray positioned below and to maintain the cooked food product in a substantially horizontal orientation.

In some embodiments shown in FIGS. 13 and 14, the walls 108, 109 that define the enclosure may support a plurality of vertical tracks are provided to align the trays 900 such that they are aligned for being lifted by the elevator 150. Specifically, the first wall 108 may support rear track 136 and front track 132, and the opposite second wall 109 may support rear track 138 and front track 134. In some embodiments, all of tracks 132, 134, 136, 138 may be provided, while in other embodiments only some of these tracks may be provided. As shown in FIGS. 3 and 4, the tray 900 that is configured to be used with the system 100 may include multiple voids 940 that are positioned to allow the tracks to extend therethrough, with the ledge establishing formations 931 on the ends thereof to extend between the tracks upon each of the first and second walls 108, 109.

In some embodiments, the front tracks 132, 134 may be movable with respect to the respective wall 108, 109, with the tracks 132, 134 being biased to extend into the enclosure 120, such as to the same distance into the enclosure as the rear tracks 136, 138 extend. The front tracks 132, 134 may be capable of being urged into the respective wall, such that a tray 900 (or a stack of trays 900) when being slid horizontally within the enclosure 120 may clear the front tracks 132, 134 (FIG. 14) and then when the tray 900, and specifically the formations 931 on both ends of the tray 900, clears the front tracks 132, 134 the front tracks return to their normal position extending into the enclosure such that the tracks each extend through voids 940 in the surface 930 of the tray 900. The extension of the tracks 132, 134, 136, 138 through the voids 940 maintains the tray (or stack trays) 900 in position to be grabbed and translated upwardly within the enclosure 120 by the elevator 150.

In some embodiments, the enclosure 120 may include a sensor 180 (depicted schematically in FIG. 2) that is configured to monitor for at least one tray sitting upon the floor 121 of the enclosure 120. In some embodiments the sensor 180 is positioned or operable to additionally monitor for at least one tray 900 being properly positioned to be grabbed and raised by the elevator 150. The sensor 180 may send a signal (X4 in FIGS. 22, 23) to the controller 800, which may be used by the controller 800 to allow the grill 501 to continue cooking food products when the sensor 180 detects a tray 900 upon the floor 121 of the enclosure 120, and prevents the grill from cooking additional food products when the sensor determines that no trays 900 are upon the floor of the enclosure 120.

Figure 19:
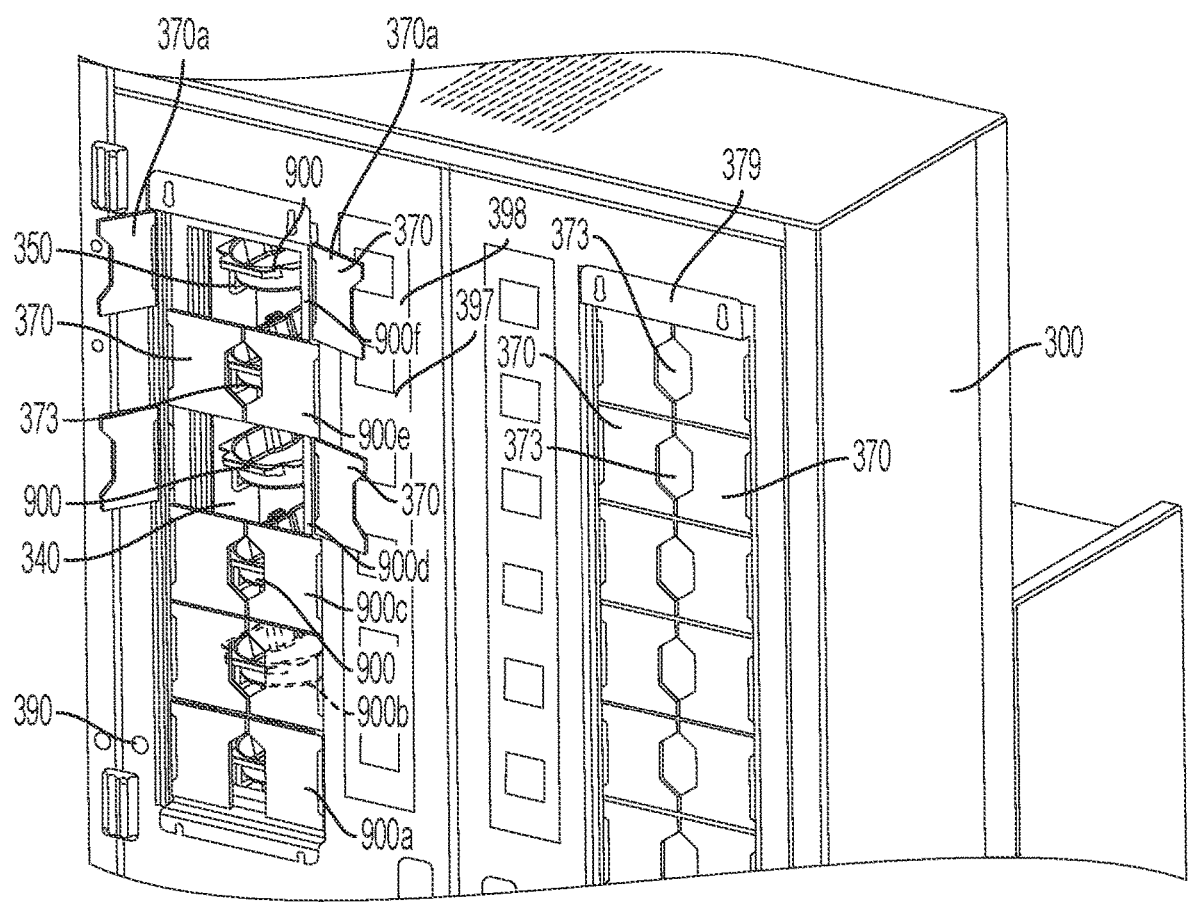
FIG. 19 is a perspective view of the heated compartment with some of the doors in the open position to allow a tray disposed within the heated compartment and aligned with the opened doors to be removed from the heated compartment.
Figure 20:
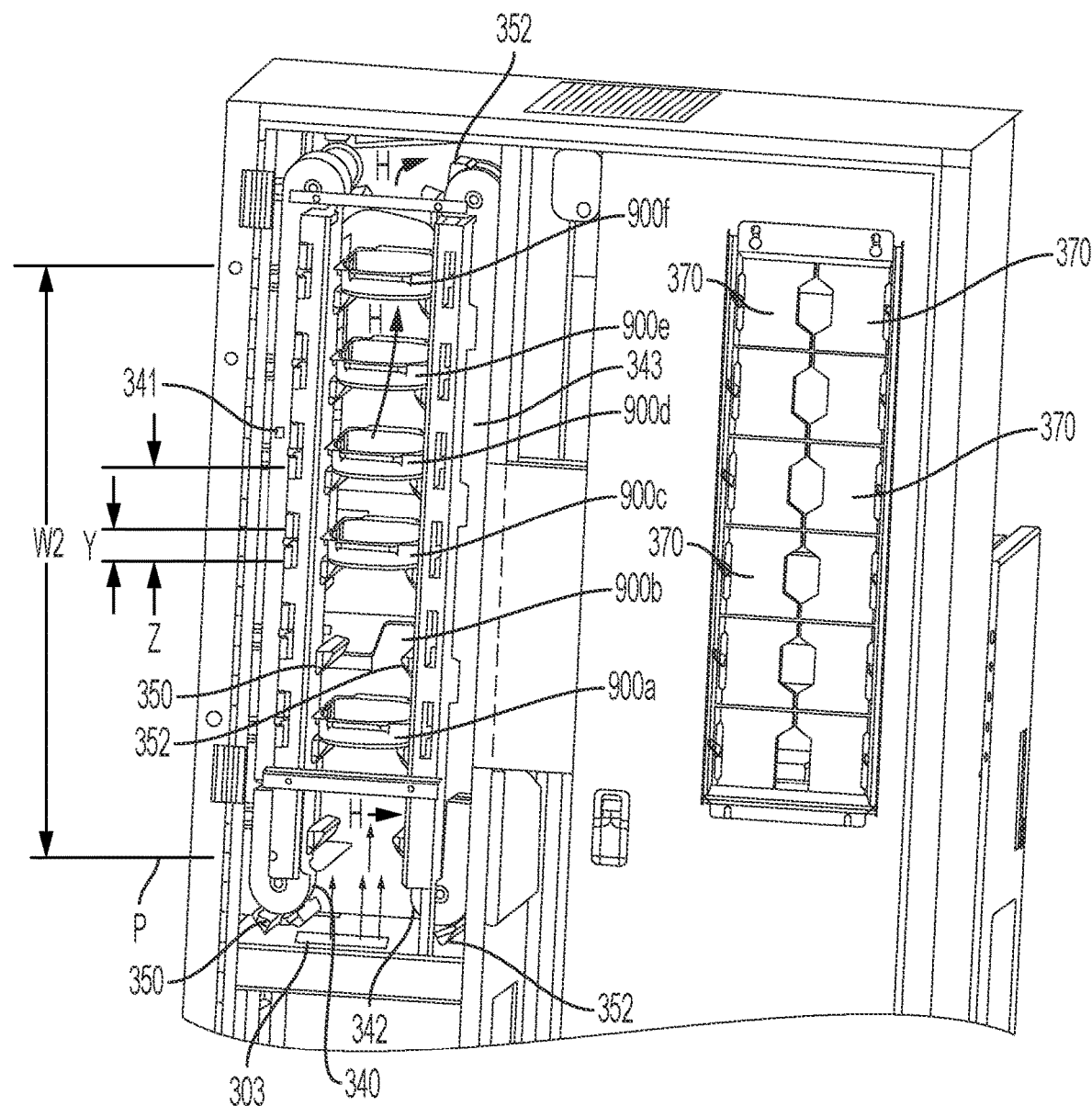
FIG. 20 is another perspective view of the heated compartment with one front panel removed.
Figure 21:
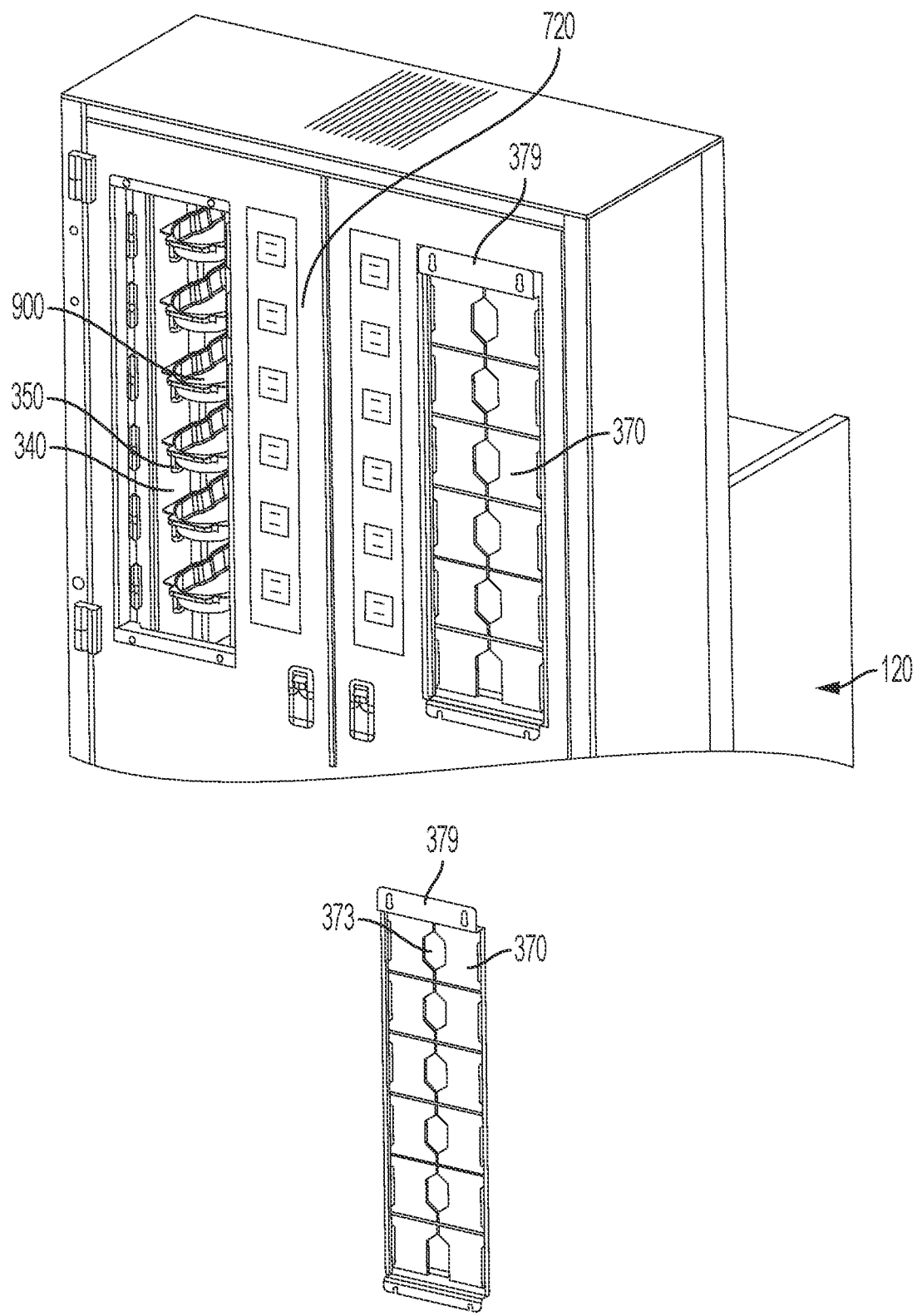
FIG. 21 is a perspective view of the heated compartment with a frame a set of doors removed and depicting the removed frame and set of doors.

Turning now to FIGS. 19-21, the heated enclosure 300 is provided. The heated enclosure 300 is configured to receive trays 900 that are filled with cooked food products 99 (either a single, a stack, or two or more stacks) for storage therewithin, either before being transferred to another storage container for heated storage until being placed upon a food product to be sold to a customer, or until removed to be placed upon the food product to be sold to the customer directly from the heated compartment 300. The heated enclosure 300 may store a plurality of trays 900 in a vertical arrangement and may operate to move trays within the heated compartment for organizational and/or inventory purposes.

The heated enclosure 300 may include two belts 340, 342 that may be arranged in a vertical fashion and disposed with respect to each other such that neighboring portions of the belts 340, 342 that face each other are slightly wider than a largest width of the tray 900. The belts 340, 342 are configured such that they are moved in the same direction and at the same speed, which may be driven by the controller 800.

Each of the first and second belts 340, 342 include a plurality of ledges 350, 352 that are disposed upon the outer surface thereof. The first and second plurality of ledges 350, 352 are disposed at the same spacing between neighboring ledges along the entire circumference of the belts, and are aligned such that each ledge 350 on the first belt is vertically aligned with a corresponding ledge 352 on the second belt 352 when the belts are each positioned such that the respective ledge is upon the belt portion facing the opposite belt portion. Each of the ledges may include a flat surface that face upwardly when the ledge is in the adjacent portion of each belt that moves vertically upward as the belt moves. The ledges 350, 352 may be a length that is similar to the length of the tray, and the trays 900 (when slid into the heated compartment 300 by the shuttle 310 in the first position) are disposed such that with upward movement of the first and second belts 940, 942, the ledges 350, 352 contact the bottom of the top surface 930 and with continued upward movement lifts the tray off of the shuttle 310, with the shuttle 310 then returning to the second position. In some embodiments, the ledges 350, 352 may include a flat surface, while in other embodiments the ledges 350, 352 may include other structures, such as cylinders, fingers, pins that extent from the respective belt 340, 342 and serve to support the surface 930 of the tray 900 to lift the tray 900 within the heated compartment 300. The ledges 350, 352 may also be discontinuous such as the ledges 350, 352, are combinations of different components that are fixed to the belt and support different portions to the tray 900 to maintain the tray 900 in a supported and horizontal position within the cabinet 300.

The plurality of ledges 350, 352 are disposed upon the respective belt 340, 342 at a spacing Z (FIG. 20) that is larger than a height of the tray 900 Y (FIG. 20). The belt is of a length above a position P where the shuttle 310 delivers a tray into the heated compartment 300 such that multiple trays 900 can be retained within the heated compartment in a stacked fashion, as depicted by dimension W2. With reference to FIG. 20 and FIG. 23, a plurality of trays can be stored within the heated compartment 300. In the representative embodiment, six trays are stored vertically upon the belts and ledges at positions 900a-900f with the height of the tray at the highest position 900f above the entry position P being equivalent to the combined height of six trays 900 and five consistent spacings therebetween, such as to allow sufficient space for air movement within the heated cabinet between vertically adjacent trays 900.

In some embodiments a top sensor 392 may be provided that identifies when a tray 900 is disposed at the top position 900$f$ and sends a signal to the controller representative of whether a tray is at the top position as schematically depicted as X5. In some embodiments, when the controller 800 receives a signal X5 that a tray is at the top position 900$f$, the controller may take one or more of the following actions 1) light up a warning light 398 such as upon the front face 301 of the heated compartment (FIG. 19), 2) send a signal to the cook, 3) send a signal to the restaurant's order processing system or inventory system, 4) initiate an audible alarm, or 5) send a signal to the feeder 504 (discussed below) that prevents further uncooked food products 99$a$ from entering the grill 501.

In some embodiments, a second sensor 391 may be provided that identifies when a tray 900 is disposed at the second to the top position 900$e$, which may also send a signal to the controller via X5 or another flow path. In some embodiments the second sensors' 391 identification of a tray at position 900$e$ may cause a warning light 397 to light up, send a warning indicator to the cook, or a warning message via the restaurant's order processing system or the like. The first and second sensors 392, 391 may be lasers, optical sensors, or other sensors known in the art to sense when an object is or is not in a specific relative position with respect to the sensor 392, 391.

In some embodiments the heated cabinet 300 may be heated with one or multiple heaters, which may operate based upon feedback control in order to maintain a desired temperature within the heated compartment. In some embodiments, the heaters may be disposed within the internal space 341, 343 within each belt 340, 342. Heaters may additionally or alternatively be disposed elsewhere in the cabinet. In some embodiments, the cabinet 300 may include one or more fans to cause air to move within the cabinet to establish a uniform temperature within the cabinet as well as for convection heat transfer to the food products within the trays 900.

The cabinet 300 may support a plurality of doors 370 that are positioned in alignment with each position 900$a$-900$f$ within the cabinet, in some embodiments, such that a door 370, or set of doors 370$a$ that are aligned with one of the positions 900$a$-900$f$ such that opening a door 370 (doors) may be opened to allow for access to the specific position 900$a$-900$f$, while other doors that are aligned with other specific positions are maintained closed.

In some embodiments, the doors 370 (370$a$) may be urged into the closed position. The door/doors may include an aperture 373 that is aligned with the tray 900 disposed at the respective position proximate to the doors such that the user can reach one or more fingers or a cooking implement (fork, small spatula, hook) through the aperture 373 and manipulate the tray 900 to pull the tray out of the heated compartment 300, wherein when the tray is pulled out of the cabinet, the tray 900 contacts the doors 370 (370) and urges the doors to the open position (depicted on FIG. 19, doors associated with positions 900$d$, 900$f$—showing the doors open but one of ordinary skill in the art will easily understand that by pulling the tray out of the cabinet (through the aperture 373 will force the doors to the open position). The aperture 373 may be sized to minimize the amount of heat that escapes the heated compartment through the aperture 373 but still allow the user to easily manipulate tray by extending fingers or a tool through the aperture 373. The doors 370 may be constructed form a transparent such that the user can see a tray positioned behind the doors 370 with the doors shut (as depicted in FIG. 19 in position 900$b$).

In some embodiments, the each of the doors 370 may be disposed upon a frame 379, which can be attached or removed from front wall of the heated compartment 300, preferably without any tools. FIG. 21 depicts the frame 379 removed from the front wall of the heated compartment 300.

In some embodiments, the heated compartment 300 may include a flowing air curtain (FIG. 20, shown schematically in arrows H) that flows across an opening into the compartment 300. The air curtain H may be provided across the opening to allow a user to easily grab and remove a tray from a position within the compartment 300, with the air curtain (either heated air or potentially ambient temperature air) while preventing or minimizing heat flow out of the heated compartment 300, and preventing the entry of foreign material (dust, insects, hair, dirt, or other debris) into the heated compartment 300 from outside in the kitchen area.

In the embodiments depicted in FIGS. 1-21, the system 100 may be configured to receive cooked food products 99 periodically and consistently from two cooking food arrangements (such as two conveyors 502, or a single conveyor 502 that can carry two cooked food products next to each other). In these embodiments, two parallel systems are provided, i.e. two forks 210, two shuttles 310, two elevators 150, two heated compartments 300, etc. In other embodiments the system 100 may operate from a single cooking line or more than two cooking lines depending upon the needs for receiving and processing cooked food products by the restaurant or facility.

With particular reference to FIGS. 22 and 23, the controller 800 controls the operation of the system 100 and in some embodiments controls the operation of a cooking appliance, such as a grill 501, that is disposed in conjunction with the system 100, such that the system receives a cooked food product 99 in a repeating basis and operates to store the cooked food products 99 in trays 900 for convenient use by a cook in restaurant activities.

The controller 800 may direct the operation of the following components based upon signals received from various components and sensors associated with various parameters. While the specification refers to a controller 800, one of ordinary skill in the art will readily appreciate that the system 100 may include one or multiple controllers 800 that may communicate with each other and work in conjunction with each other and with the cooking appliance.

In some embodiments, the controller 800 is in communication with the cooking device to send a signal that allows or prevents the cooking device from cooking further food products 99$a$. For example, in some embodiments the system 100 may be operated in conjunction with a grill 501 that automatically and periodically (such as in a repeated manner with a consistent delay time between beginning to cook new food products 99$a$, such as every 6 seconds, every 10 seconds or another delay time sufficient to ensure an adequate space (both in time and in position) between adjacent food products that are being cooked, both for proper continuous cooking of multiple food products in series as well as with sufficient delay time for the system 100 to operate—such as to allow for the elevator 150 and shuttle 310 to operate to move a full tray to the heated compartment 300 and for the shuttle 310 to return to the second position to receive a new tray 900 lifted by the elevator 150 from the tray(s) stacked within the enclosure 120). The cooking device may be a grill 501 that receives a continuous feed of uncooked food products 99$a$, which may be previously positioned within a freezer 503, with the food products 99a being moved from the freezer 503 and into the grill 501 by a mover 504. In some embodiments, the controller 800 is in communication with the mover 504 (shown schematically with signal path X6) either directly or via a controller that is associated with the cooking device. In these embodiments, a signal X6 from the controller 800 may prevent the mover 504 from inserting new food products 99a into the grill 501 based upon the conditions discussed below, or alternatively the controller 800 may provide a signal that it is allowed for the mover 504 to insert new food products 99a into the grill 501.

The controller 800 may prevent the mover from cooking additional food products 99a when any of the following situations occurs: 1) there is no tray positioned upon the platform 308 to receive cooked food products as monitored by signal X1, 2) there are no trays disposed within the enclosure 120 as monitored by signal X4, 3) there is a tray disposed at the top position 900f of the heated compartment 300 as monitored by signal X5, 4) a user input into the controller 800 that no further cooking is desired, 5) an input to the controller 800 from the facilities POS, inventory monitoring or other systems that no further cooking is necessary.

In some embodiments, the controller receives a signal via path X6 from the mover 504 that a new food product 99a has been placed within the grill 501. The controller 800 may then establish a clock that monitors the elapsed time until a signal is received from the fork via path X7. Based upon counting the initial mover signal and the initial fork signal, the controller can keep track that all of the food products 99a that enter the grill 501 eventually enter the system 100 via matching the expected fork signals X7 with the mover signals X6. If the fork signal for a specific food product based upon the controller's tracking is not received within the expected range of delay times (based upon a programmed expected duration of time for the food product to be cooked and moved to the fork after the mover 504 inserts the food product 99a into the grill 501), the controller 800 may send a signal or message to the operator, or light up a warning light or other notifications to prompt the user to investigate whether there is a problem in the cooking appliance.

In some embodiments, the controller 800 controls the position of the shuttle 310 and causes the shuttle 310 to move between the first and second positions, and also to move the shuttle 310 to align the tray with the first and second tray positions 910, 920 below the fork 210. The controller 800 is configured to count the number of cooked food products 99 received within each tray position, and move the shuttle to establish two (or more depending upon the tray design) columns of cooked products 99 upon the tray. The controller 800 may count the number of cooked food products 99 received within the tray via a signal from the sensor 240 associated with the fork 210. When the controller 800 determines that the tray 900, the controller sends a signal X1 to cause the shuttle 310 to move the tray to the heated compartment 300 and then when the shuttle 310 is in the first position causes motion of the first and second belts 340, 342 to lift the tray off of the shuttle 310 and position the tray in the first position 900a in the heated compartment 300. Motion of the belts 340, 342 causes the trays that were previously placed therein to move up to the next higher position (900a to 900b, 900c to 900d, etc.). If a tray moves to the top position (900f) (signal X5) the controller 800 sends a signal to the mover (X6) to cause the mover 504 to discontinue moving food products 99a to the trill, and the controller 800 may also cause an audible, visual, or other warning or signal to the user or to the facility notifying the operator that the tray from the top position 900f needs to be removed. Once the tray from the top position is removed based upon the change in the sensor 392 via signal X5, the controller 800 may send a signal X6 that allows the mover 504 to restart applying food products 99a to the grill 501.

In some embodiments, the controller 800 may keep in its memory the number of food products that are disposed within each tray disposed within the heated compartment 300, and may update a display that provides various indications. The display may be upon the heated compartment (FIG. 21, element 720) and/or may be remote, such as upon a screen that is positioned where the user prepares food for customers. The controller 800 may also provide information for the display for user remotely or via an app such as via known internet of things technologies. The indications provided by the display may include 1) time the tray has been within the heated compartment, 2) time since tray first received a cooked food product, 3) number of cooked food products disposed within tray, 4) type of food(s) within tray, 5) whether the food(s) in tray are based upon special order, and the like.

In some embodiments, the controller 800 further communicates with the mover 504 to determine whether there is a food product 99a currently being cooked, i.e. a food product that has been passed by the mover 504 and into the grill 501 and still within the preprogrammed delay time until it is expected that the cooked food product 99 will reach the fork 210. If the controller 800 senses that there are no food products 99a within the grill 501 or traveling upon the conveyor 502, the controller causes the shuttle 310 (X1) to move to the first position within the heated compartment 300 and then the belts 340, 342 to lift the tray from the shuttle—with the elevator 150 grabbing a new tray 900 from the enclosure 120 and lifting above the shuttle 310 before the shuttle returns to the second position. This functionality of the controller when provided to minimize the time that a cooked food product 99 rests upon the tray 900 outside of the heated compartment 300.

Turning now to FIGS. 24 to 29 and with continued reference to FIGS. 22-23 a dispenser 400 for applying a substance to a food product moving with respect to the dispenser 400 is provided. In some embodiments, the dispenser 400 may be configured to apply by dropping a plurality of chopped onions (4001, schematic) onto a cooked food product 99 as it is moved under the dispenser 400 via a conveyor 502. One of ordinary skill in the art will understand after a thorough review of the subject disclosure that the dispenser can be used to apply different food products (onions, lettuce, tomato, cheese and can be optimized by size and shape to perform that task with only routine optimization.

The dispenser 400 includes a housing 410 that receives a volume of the food to be applied as desired. The housing 410 includes an opening 412 at the bottom thereof through which the food product falls therethrough during operation. The housing supports a shaft 430 that extends with a center axis 1001 therethrough. The shaft 430 is free to rotate within the housing and may be supported by the housing with one or more bearings or other anti-frictional components. The shaft 430 may include one or more threads 440 such that the shaft 430 acts as an auger within the housing, and when rotating agitates and mixes the food 4001 within the housing 410 such that when the shaft 430 rotates a volume falls through the opening 412.

Figure 25:
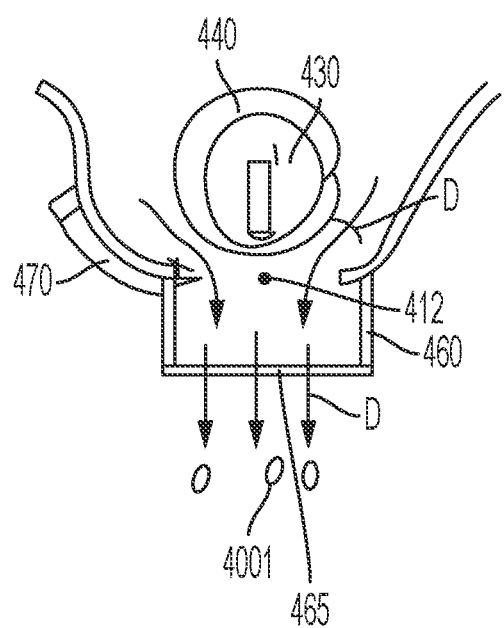
FIG. 25 is a side section view of the dispenser of FIG. 24 with the mode selector in a dispense position.
Figure 26:
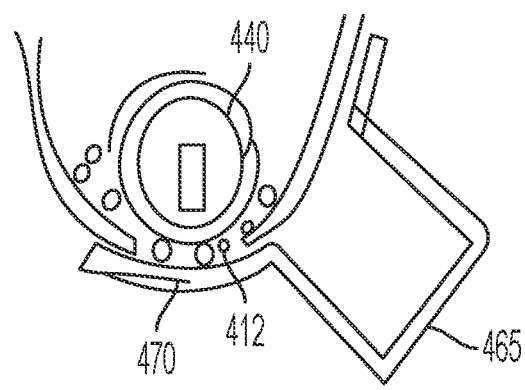
FIG. 26 is the view of FIG. 25 with the mode selector in the isolated position.
Figure 25A:
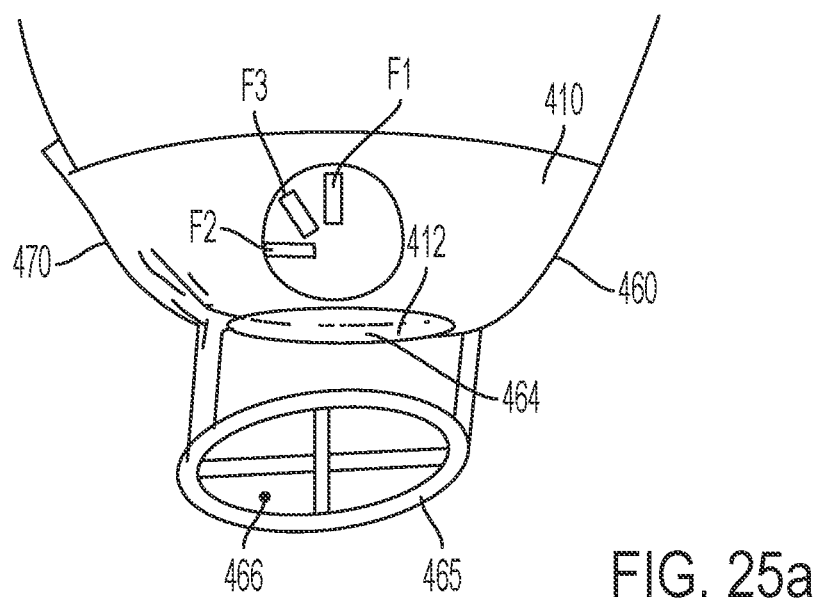
FIG. 25a is a bottom perspective view of the dispenser of FIG. 24 with the mode selector in the dispense configuration.
Figure 26A:
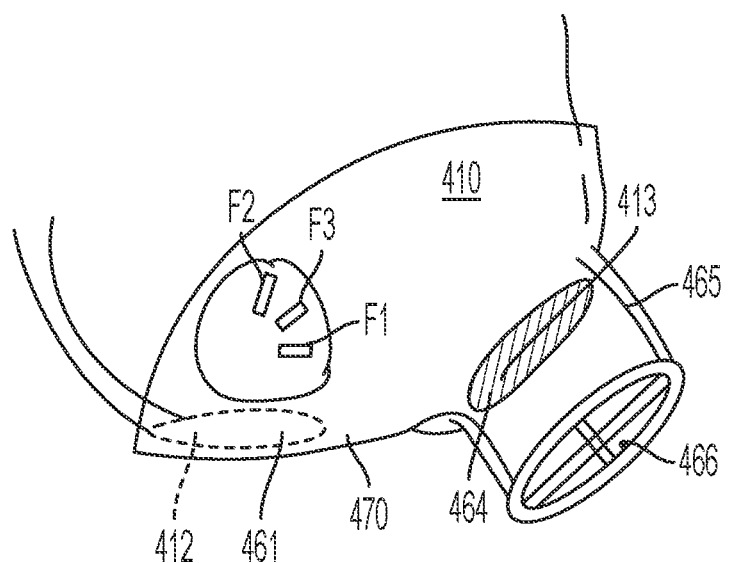
FIG. 26a is the view of FIG. 25a with the mode selector in the isolated position.

The housing 410 may movably support an a control device 460 that includes two or more positions to control the operation of the dispenser 400, as schematically shown in FIGS. 25-26a. In some embodiments the control device 460 may rotate with respect to the housing between a first position F1 (FIGS. 25, 25a) and a second position F2 (FIGS. 26, 26a). In the first position F1 an aperture 464 of the control device 460 is aligned with the opening 412 in the housing 410 to allow food product to fall from the opening 412 of the housing. In the second position F2, the control device 460 is moved with respect to the housing 410 such that the aperture 464 is no longer aligned with the opening 412 in the housing (as depicted schematically in FIG. 26a at element 413), and a wall 461 of the control device 460 is aligned with the opening 412 (depicted in FIG. 26a with the opening 412 depicted in broken lines). In some embodiments, the control device is rotatable with respect to the housing 410 and the control device 460 is supported by the shaft 430, or the support structure of the housing 410 that supports the shaft 430. The control device may include a screen 465 that is disposed at an extended position from the aperture 464 such that the screen is spaced from the aperture, with the screen being below the aperture 464 when the control device is in the first position F1. The screen includes a plurality of apertures 466 that extend therethrough to allow food product to fall therethrough.

In some embodiments, the control device 460 may include a third position with respect to the housing 410 (F3, FIGS. 25a, 26a) that allows the control device 460 to be removed from the housing 410 when so positioned. In some embodiments, the shaft 430 may be removed from the housing 410 when the control device 460 is removed from the housing 410, which allows the dispenser to be taken apart, such as for cleaning without any tools.

In some embodiments, the dispenser 400 may be supported by an output shaft 600 and the dispenser 400 may be supported in a cantilevered manner by the output shaft 600. The output shaft 600 may be supported by a housing (not shown) of the cooking device and may be controlled to rotate when a controller of the cooking device determines that the food product associated with the dispenser should be applied to a food product (in the embodiment depicted in FIGS. 22 and 23 and described here a cooked food product 99, but in other embodiments it could be a food product 99a that has not yet been cooked). In some embodiments, a sensor 490 (schematic FIGS. 22, 23) may be provided upstream of the dispenser 400 to identify when a food product is approaching the dispenser 400 (FIG. 22). For example, in some embodiments, the sensor 490 may be a known distance upstream from the dispenser 400 above the conveyor, and when the sensor 490 identifies a food product upon the conveyor 502 approaching the dispenser, a controller 801 (FIG. 23 via schematic signals X8 and X9) (or the controller 800 associated with the system 100 discussed above) may cause the output shaft 600 to rotate after a set delay time (based upon the known speed of the conveyor 502 and the known distance between the sensor 490 and the dispenser 400), which causes the shaft 430 to rotate, and maintains the shaft rotating 430 based upon a known time that the food product travels below the dispenser 400. As the shaft rotates, food product 4001 falls upon the food product 99 traveling below the dispenser as depicted in FIG. 23.

The sensor 490 may be a heat sensor, an optical sensor, a laser sensor, or other known sensors that can determine that an object is at an identified position with respect to the sensor.

Figure 24:
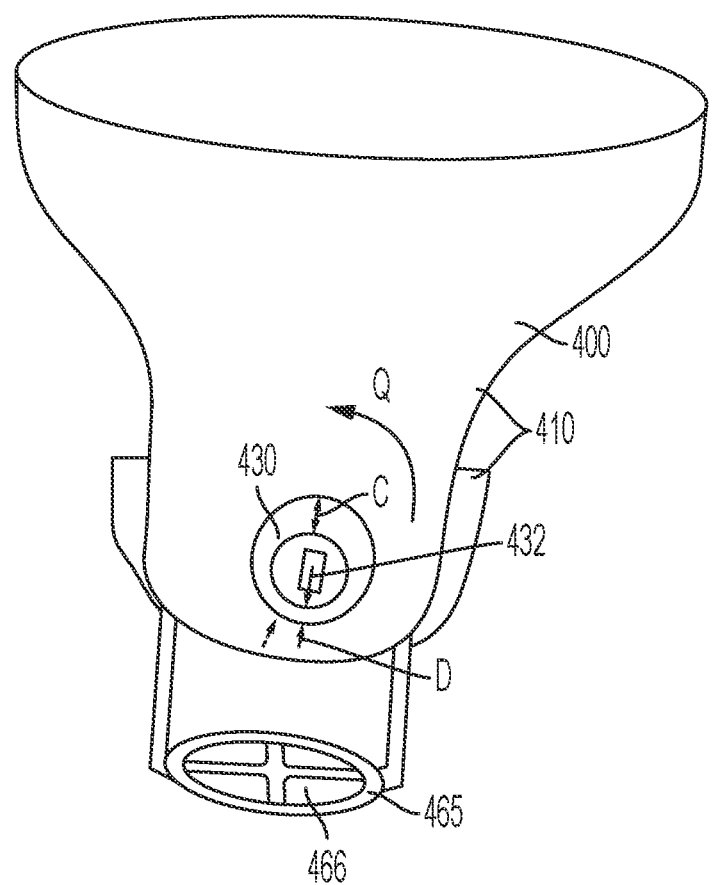
FIG. 24 is a front perspective view of a dispenser depicting a torque receipt component.
Figure 28:
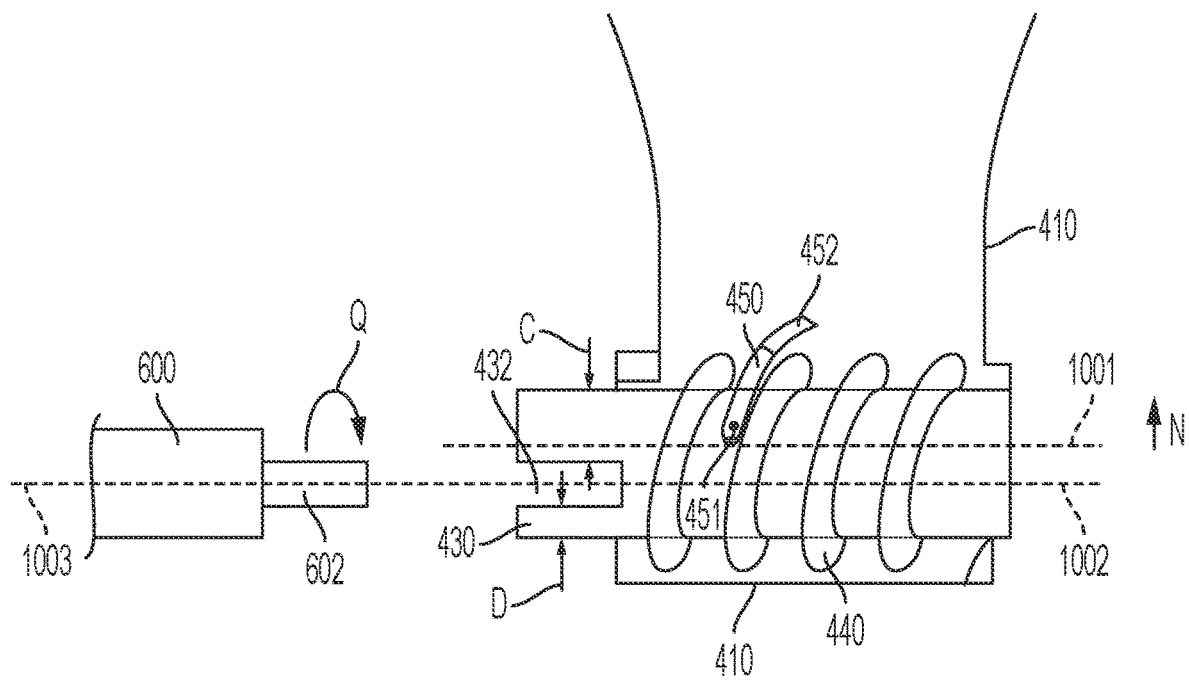
FIG. 28 is a sectional view of the coupling between an input and the shaft in a first rotational position of the shaft.
Figure 29:
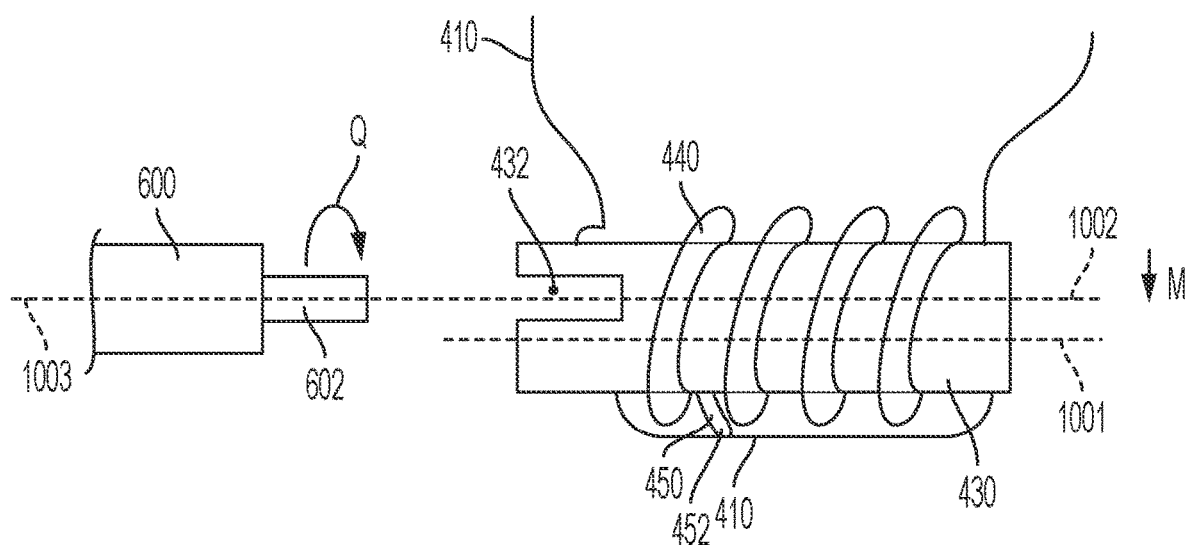
FIG. 29 is the view of FIG. 28 depicting the shaft in an opposite rotational position.

Turning now to FIGS. 24, 28, and 29, the dispenser 400 may be mounted with respect to the output shaft 600 such that the dispenser is agitated as the output shaft 600 is rotated. The output shaft 600 may include a transmission 602, such as a feature with one or more flats, and the dispenser shaft 430 may include a corresponding transmission 422 to engage and receive torque from the output shaft 600. The transmission of the dispenser shaft 422 may be aligned such that an axis 1002 through the transmission 422, which aligns with an axis 1003 through the output shaft 600 that is offset from a central longitudinal axis 1001 of the dispenser shaft 1001. Because the dispenser shaft 1001 is rotatably supported by the housing (to allow rotation of the shaft 430 with respect to the housing 410 but to prevent relative vertical and horizontal motion with respect to the housing 410) as the output shaft 600 rotates, the housing moves upward and downward with respect to the axis 1003 of the output shaft 600, as depicted by arrows N and M in FIGS. 28, 29. This cyclic vertical upward and downward motion (in the presence of the constant force of gravity) of the housing 410 during rotation causes the food product 4001 contents within the housing 410 to be agitated, which has been experimentally observed to avoid clumping of food product 4001 within the housing 410, which has been observed to aid in the consistent amount of food product 4001 that falls out of the housing 410 as the shaft 430 rotates, and onto the food product 99 moving below the dispenser 400.

As best shown in FIGS. 27a-29, in some embodiments, a bar 450 is fixed to the shaft 430 at a first end 451, and has an opposite end 452 that extends in a cantilevered fashion from the shaft 430. The bar 450 may be flexible such that the orientation of the bar 450 can be modified (by interacting with the walls of the housing 410 as discussed below) but the bar 450 returns to its nominal shape when the bar 450 is released from contact with the housing 410.

Figure 27D:
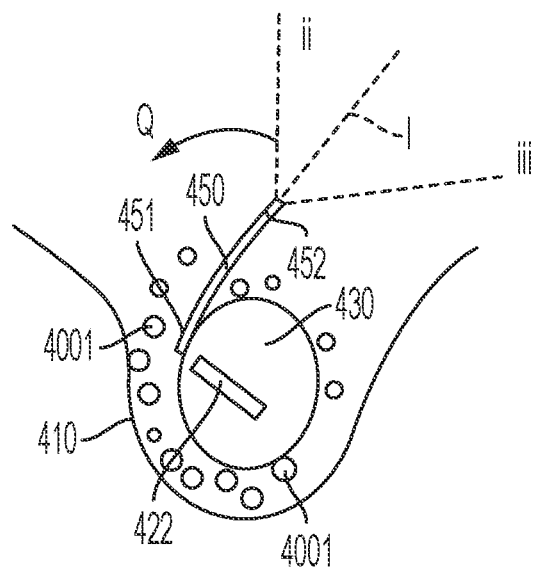
FIG. 27a-27d are sectional views of the shaft in various rotational positions with respect to the housing.

In some embodiments, the bar 450 is fixed to the housing upon the first end 451 with surface to surface contact with the shaft at a contact surface and the bar extends from the shaft at a substantial tangent to the contact surface of the shaft 430. The term "substantial tangent" is defined herein to mean a geometric tangent as well and up to plus or minus 25 degrees above or below the geometric tangent. The substantial tangent orientation is depicted in FIG. 27d with a range of positions falling within the definition of substantial tangent depicted as the range between ii and iii. In some embodiments, the bar 450 may have a slight curve along its width along the length of the bar 450, which may aid in the bar returning to its nominal substantial tangent position when released from the housing (as depicted in FIG. 27c).

Figure 27A:
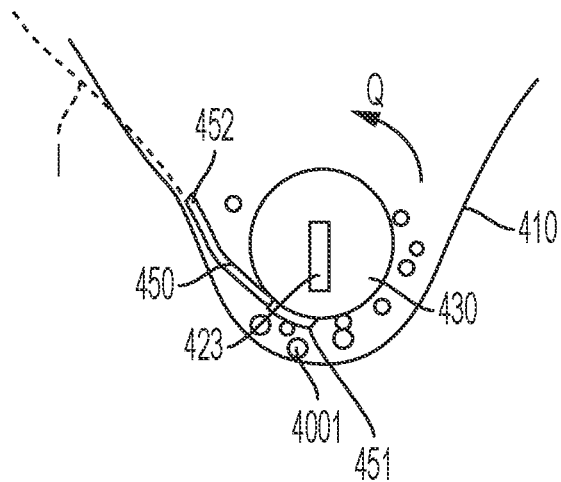
Figure 27B:
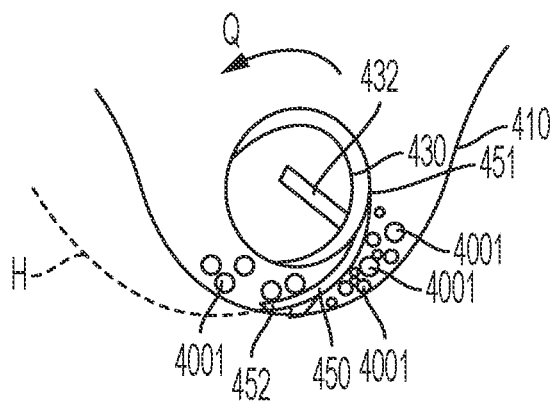
Figure 27C:
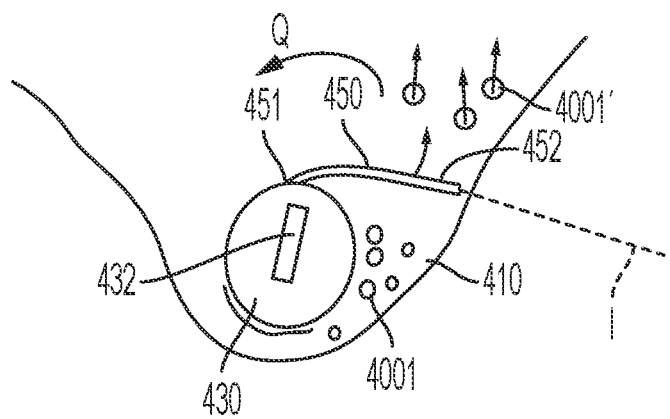

As depicted in FIG. 27a, the shaft 430 rotates in direction Q and bar 450 approaches contact and makes contact with an inner surface of the housing 410 proximate to the shaft 430, and with contact the housing 410 compresses the second end 452 of the bar 450 toward the shaft 430. As shown in FIG. 27b, with continued rotation, the second end 452 of the bar 450 has scrapped past a distance of the inner wall of the housing 410 and scrapped ways pieces of food product 4001 (schematic FIG. 27b) that may have previously been stuck to the inner wall of the housing 410. In FIG. 27c after further rotation, the second end 452 is free of the inner wall of the housing 410 and springs back toward its substantially tangent orientation, which tends to "flick" the food product 4001 away from the housing 410, as shown schematically with arrows 4001'. As the shaft 430 continues to rotate the bar again approaches the inner wall 410 as depicted in FIG. 27d.

While the preferred embodiments of the disclosed have been described, it should be understood that the invention is not so limited and modifications may be made without departing from the disclosure. For example, it is contemplated that the system described above may be used to receive and store various types of food products in trays for later use. Alternatively, only portions of this design may be used independently in an automated food handling system or with components of other types of food handling systems not disclosed herein, such as a fork and elevator associated with other components of a handling system, or an elevator and shuttle, or a shuttle and heated compartment, as discussed above. The dispenser discussed above may be used with one or more of the fork, elevator, shuttle, and heated compartment, or may be used alone on a conveyor or other system for repeatedly applying the same food product to food products that pass under a dispenser. The scope of the disclosure is defined by the appended claims, and all devices that come within the meaning of the claims, either literally or by equivalence, are intended to be embraced therein.

The numbered paragraphs provided below are some examples of disclosed embodiments.

Numbered Paragraph 1: An automated food management system, comprising:
- an enclosure, the enclosure is configured to receive a plurality of stacked trays, and an elevator that is configured to lift a tray from a plurality of stacked trays when received within the enclosure to a position where the lifted tray can receive the cooked food product, the enclosure further comprises a fork that receives a cooked food product thereon and rotates to allow the cooked food product to fall into the positioned tray,
- a holding compartment with a shuttle, the shuttle longitudinally movable between a first position within the holding compartment and a second position disposed to support the lifted tray in a position to receive a cooked food product from the fork, the holding compartment capable of supporting a plurality of trays in a vertical arrangement such that a lowest supported tray in the vertical arrangement is the tray most recently positioned within the holding compartment and the highest supported tray in the vertical arrangement is the tray that has been positioned within the holding compartment for the longest time.

Numbered Paragraph 2: The automated food management system of Numbered Paragraph 1, further comprising a tray, wherein the tray comprises first and second positions that are spaced apart from each other, wherein the tray is configured to receive a plurality of stacked cooked food products in the first position and to receive another plurality of stacked food products in the second position, wherein when the shuttle supports the tray when the shuttle is in the second position, the shuttle sequentially supports the tray such that one or more cooked food products are initially disposed within the first position upon the tray and then one or more food products are disposed within the second position upon the tray.

Numbered Paragraph 3: The automated food management system of Numbered Paragraph 1, wherein the fork is configured to periodically receive a cooked food product from a conveyor that transports a cooked food product from a grilling apparatus.

Numbered Paragraph 4: The automated food management system of Numbered Paragraph 1, wherein the fork extends in a cantilevered manner from an input, wherein the fork moves between an acceptance position and a release position as controlled by the input, wherein upon receipt of a cooked food product upon the fork in the acceptance position the fork rotates toward the release position.

Numbered Paragraph 5: The automated food product management system of Numbered Paragraph 4, wherein the cooked food product falls from the fork as the fork moves from the acceptance position toward the release position, wherein the cooked food product is maintained in a substantially horizontal position as the fork rotates from the acceptance position toward the release position and as the cooked food product falls off of the fork.

Numbered Paragraph 6: The automated food product management system of Numbered Paragraph 4, further comprising a first sensor that identifies a cooked food product disposed over or upon the fork, wherein the first sensor upon identification of the cooked food product provides a signal that causes the fork to rotate from the acceptance position to the release position.

Numbered Paragraph 7: The automated food product management system of Numbered Paragraph 1, wherein the elevator is configured to dispose the tray from the plurality of stacked trays onto the shuttle when the elevator is lifted to a top position.

Numbered Paragraph 8: The automated food product management system of Numbered Paragraph 1, wherein the elevator engages a tray within the enclosure by approaching the tray from the plurality of stacked trays from above the tray.

Numbered Paragraph 9: The automated food product management system of Numbered Paragraph 8, wherein the elevator comprises a plurality of fingers that are biased radially outwardly and are translated inwardly as the elevator passes downwardly with respect to an edge of a tray, wherein when the plurality of fingers return to their outward position as the elevator passes below the edge such that the plurality of fingers are each disposed below and in alignment with the edge, such that upward movement of the elevator also lifts the tray due to the engagement of the plurality of fingers and the edge of the tray.

Numbered Paragraph 10: The automated food management system of Numbered Paragraph 1, wherein the housing includes first and second walls that establish the enclosure, wherein a first track is disposed upon at least a portion of the first wall and extends into the enclosure and a second track is disposed upon at least a portion of the second wall and extends into the enclosure, wherein each of the first and second tracks align the tray within the housing in a position to be received by the elevator.

Numbered Paragraph 11: The automated food management system of Numbered Paragraph 10, wherein the first and second tracks are biased toward a position where they extend into the enclosure, and can be urged into the respective first and second walls to allow a tray to be slid past the first and second tracks until the tray is aligned such that the first and second tracks are in registration with respective first and second receipt notches within the tray, wherein the tray is in the position to be received by the elevator.

Numbered Paragraph 12: The automated food management system of Numbered Paragraph 11, wherein an edge of the tray when sliding horizontally with respect to the first and second tracks is configured to contact each of the first and second tracks and urge the first and second tracks into the respective first and second walls.

Numbered Paragraph 13: The automated food management system of Numbered Paragraph 1, further comprising a sensor that determines the presence or absence of one or more trays within the enclosure.

Numbered Paragraph 14: The automated food management system of Numbered Paragraph 1, wherein the elevator comprises a sensor that is configured to detect whether the elevator is vertically aligned with respect to a tray within the enclosure.

Numbered Paragraph 15: The automated food management system of Numbered Paragraph 1, wherein the holding compartment comprises first and second vertical belts that face each other, wherein when the shuttle is in the first position the shuttle extends between the first and second belts such that motion of the first and second belts lifts a tray disposed upon the shuttle vertically off of the shuttle.

Numbered Paragraph 16: The automated food management system of Numbered Paragraph 15, wherein the first and second vertical belts each comprise a plurality of spaced ledges, wherein the plurality of ledges on each of the first and second vertical belts are aligned in registry with a ledge upon the opposite belt, wherein the plurality of ledges upon each of the first of the respective first and second belts are spaced at a distance greater than a height of the tray such that a plurality of vertically spaced trays can be simultaneously be disposed within the holding cabinets at different vertical positions therewithin.

Numbered Paragraph 17: The automated food management system of Numbered Paragraph 16, wherein the holding compartment includes at least one sensor that is configured to detect a tray positioned upon the spaced ledges at a first predetermined vertical height above a floor of the holding compartment.

Numbered Paragraph 18: The automated food management system of Numbered Paragraph 17, wherein the at least one sensor is first and second sensors, a first sensor is positioned at the first predetermined vertical height above the floor of the holding cabinet and a second sensor is positioned at a second predetermined vertical height above the floor which is higher than the first predetermined height, wherein the second sensor is configured to provide a signal when a tray is aligned with the second sensor, wherein the signal is received by a controller that operates a grill that is configured to automatically cook food products and causes the grill to cease cooking further food products until the tray is removed from alignment with the second sensor.

Numbered Paragraph 19: The automated food management system of Numbered Paragraph 15, wherein the holding compartment is configured to support a plurality of trays between the first and second belts and disposed in a spacing vertical relationship extending from a position where the shuttle is in the first position, wherein the holding compartment comprises a plurality of access doors that are independently openable and are disposed at each respective vertical position of the plurality of trays.

Numbered Paragraph 20: The automated food management system of Numbered Paragraph 19, wherein each of the plurality of access doors includes two doors that in combination when in a closed position enclose the tray within the holding compartment and can be moved to an open position to allow for removal of the tray disposed in registry with the two doors from the holding compartment.

Numbered Paragraph 21: The automated food management system of Numbered Paragraph 20, wherein the two doors define an aperture when in the two doors are in the closed position, wherein the aperture is configured to allow a user to extend one or more fingers through the aperture to pull the tray out of the holding compartment, wherein pulling the tray urges the two doors to rotate toward the open position.

Numbered Paragraph 22: The automated food management system of Numbered Paragraph 19, wherein each of the plurality of access doors are supported by a frame, wherein the frame and each of the plurality of access can be removed from the heated compartment as a single component without any tools.

Numbered Paragraph 23: The automated food management system of Numbered Paragraph 2, further comprising a controller in communication with a first sensor that identifies a cooked food product disposed over or upon the fork, wherein the first sensor upon identification of the cooked food product provides a signal that causes the fork to rotate downwardly to allow a food product disposed upon the fork to fall into the tray either into the first position of the tray or the second position of the tray depending upon the position of the shuttle with respect to the fork, wherein the controller is configured to control the position of the shuttle to initially allow a first plurality of cooked food products to be stacked in the first position of the tray and then a second plurality of cooked food products to be stacked in the second position of the tray, wherein when the controller determines that a predetermined number of cooked food products are disposed in the first and second positions of the tray, the controller directs the shuttle to move to the first position.

Numbered Paragraph 24: The automated food management system of Numbered Paragraph 23, further comprising a user controlled manual override which when initiated causes the controller to direct the shuttle to move to the first position regardless of the number of cooked food products disposed within the tray as long as there is at least one cooked food product disposed within the tray.

Numbered Paragraph 25: The automated food management system of Numbered Paragraph 1, further comprising a controller in communication with a first sensor disposed to monitor the enclosure, a second sensor that monitors for a cooked food product being positioned upon the fork, and a third sensor that monitors for a tray being disposed at a predetermined vertical position within the heated compartment, wherein the controller communicates with an automated grill that cooks a food product that after being cooked is moved to a position to be disposed upon the fork, wherein the controller provides a signal to prevent the automated grill from cooking additional food products when the third sensor identifies a tray being disposed at the predetermined vertical position, or when the first sensor detects that there are no trays positioned within the enclosure.

Numbered Paragraph 26: The automated food management system of Numbered Paragraph 25, wherein the controller further controls the position of the shuttle, wherein when the controller determines that the automated grill is not cooking any food products the controller causes the shuttle to move to the first position within the heated compartment such that any food products disposed upon the tray disposed upon the shuttle are positioned within the heated compartment.

Numbered Paragraph 27: The automated food management system of Numbered Paragraph 26, wherein the controller determines that the automated grill is cooking a food product based upon a receipt of a signal initiated when a food product enters the grill to be cooked by the grill from a storage area, and wherein the controller is programmed with a duration of time that the food product takes to be cooked and to be moved to the fork after the signal that the food product enters the grill to be cooked by the grill has been received.

The invention claimed is:

1. A mechanism to automatically dispose a food product upon an object moving upon a conveyor, comprising:
 a housing to receive and store a food product to be dispensed, the housing configured to be disposed above a conveyor, the housing comprising an outlet hole that is disposed above the conveyor,
 a shaft rotationally coupled to the housing and configured to receive torque from an external source such that the shaft rotates upon rotation of the external source, the shaft comprises an input configured to engage with the external source and receive torque from the external source to allow rotation of the shaft with respect to the housing but to prevent relative vertical and horizontal motion with respect to the housing, the input disposed at an eccentric position upon the shaft with respect to a longitudinal axis of the shaft through a center of the shaft, such that rotation of the external source causes rotation of the shaft and reciprocating cyclic linear motion of the shaft with respect to a longitudinal axis through a center of the external source.

2. The mechanism of claim 1, wherein the housing includes a control device that is movably supported by the housing, the control device comprises an aperture thereon, wherein the control device may be positioned in a first position with respect to the housing to align the aperture on the control device with the outlet hole in the housing to allow food product to fall through the outlet hole in the housing below the shaft and through the aperture, wherein the control device may be moved to a second position with respect to the housing where a wall of the control device is aligned with the outlet hole in the housing to prevent food product from extending out of the outlet hole and to prevent the food product from falling out of the housing via the outlet hole, wherein the control device further comprises a selector that allows the user to manually move the control device between the first and second positions.

3. The mechanism of claim 2, wherein the control device is rotatable to a third position with respect to the housing to allow the control device to be removed from the housing to allow the mechanism to be disassembled without an tools.

4. The mechanism of claim 2, wherein the control device further comprises a screen disposed below the aperture.

5. The mechanism of claim 1, wherein the shaft is an auger with a helical tooth that extends at least a portion of the length of the shaft, wherein the shaft further supports a flexible bar that extends outwardly from the shaft, wherein the flexible bar rotates with rotation of the shaft, wherein when the flexible bar rotates with the shaft through a first arc length of the shaft that is a first portion of a complete rotation of the shaft the flexible bar contacts an inner wall of the housing and slides upon the inner wall of the housing, and when the flexible bar rotates with the shaft through a second arc length of the shaft that is a remainder of the complete rotation of the shaft the flexible bar does not contact the inner wall of the housing.

6. The mechanism of claim 5, wherein the flexible bar is biased toward a position where the flexible bar extends outwardly from the shaft in a direction that is substantially tangent to an outer surface of the shaft, wherein the flexible bar is bent into an arcuate configuration as the flexible bar contacts the inner wall and slides upon the inner wall of the housing and the flexible bar springs to return toward the substantially tangential configuration as the flexible bar clears away from contact with the inner wall of the housing.

* * * * *